United States Patent
Ito et al.

(10) Patent No.: US 9,082,032 B2
(45) Date of Patent: Jul. 14, 2015

(54) SYSTEM FOR READING INFORMATION CODE AND MEDIUM ON WHICH INFORMATION CODE IS FORMED

(75) Inventors: Yuichi Ito, Nagoya (JP); Koji Konosu, Kariya (JP); Takao Ushijima, Toyoake (JP); Jun Ogawa, Chiba (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 10 days.

(21) Appl. No.: 13/403,515

(22) Filed: Feb. 23, 2012

(65) Prior Publication Data

US 2012/0153025 A1    Jun. 21, 2012

Related U.S. Application Data

(63) Continuation of application No. 13/307,436, filed on Nov. 30, 2011, now abandoned.

(30) Foreign Application Priority Data

Nov. 30, 2010  (JP) .................................. 2010-267617
Mar. 29, 2011  (JP) .................................. 2011-072132
Nov. 21, 2011  (JP) .................................. 2011-253938

(51) Int. Cl.
*G06K 19/00*    (2006.01)
*G06K 7/12*     (2006.01)
(Continued)

(52) U.S. Cl.
CPC .............. *G06K 7/12* (2013.01); *G06K 7/10574* (2013.01); *G06K 7/10584* (2013.01); *G06K 7/10732* (2013.01); *G06K 19/0614* (2013.01); *G06K 19/06093* (2013.01)

(58) Field of Classification Search
USPC ................................ 235/435, 439, 454, 462
See application file for complete search history.

(56) References Cited

U.S. PATENT DOCUMENTS

2007/0278303 A1  12/2007  Cattrone
2008/0017717 A1  1/2008   Miyazaki et al.
(Continued)

FOREIGN PATENT DOCUMENTS

CN     1140501 A    1/1997
FR     2 682 790 A1  4/1993
(Continued)

OTHER PUBLICATIONS

Feb. 20, 2014 Partial European Search Report issued in EP 12 15 6734.

(Continued)

*Primary Examiner* — Matthew Mikels
(74) *Attorney, Agent, or Firm* — Oliff PLC

(57) ABSTRACT

A system reads an information code formed on a medium. The code has light modules and dark modules. The areas of the light modules are produced as inversion areas inverted light reflection characteristics. The areas of the dark module areas are produced as non-inversion areas non-inverting light reflection characteristics. A reader emits illumination light of wavelengths including infrared light wavelengths to the code, and images the code under the illumining light emission. The inversion areas, that is, the light module areas, can be dark under the visible light, but can be a light color due to its inverted light reflection characteristics. The light modules can thus be imaged by the reader under the illumining light emission, providing distinguishable detection of the inversion and non-inversion areas, allowing the light and dark modules to be extracted for decoding.

33 Claims, 18 Drawing Sheets

(51) Int. Cl.
  *G06K 7/10* (2006.01)
  *G06K 19/06* (2006.01)

(56) References Cited

U.S. PATENT DOCUMENTS

2008/0305444 A1  12/2008  Eschbach et al.
2010/0038598 A1*  2/2010  Bastiaansen et al. ......... 252/500

FOREIGN PATENT DOCUMENTS

| FR | 2 817 356 A1 | 5/2002 |
|----|----|----|
| JP | A-01-128877 | 5/1989 |
| JP | A-07-214956 | 8/1995 |
| JP | A-08-207451 | 8/1996 |
| JP | A-09-245115 | 9/1997 |
| JP | A-2007-299168 | 11/2007 |
| JP | A-2008-299422 | 12/2008 |
| JP | A-2009-009547 | 1/2009 |
| JP | A-2010-146461 | 7/2010 |
| JP | A-2010-181931 | 8/2010 |
| WO | WO 96/18972 A1 | 6/1996 |
| WO | WO 0250790 A1 * | 6/2002 |

OTHER PUBLICATIONS

Chinese Patent Office, Notification of the First Office Action mailed on Mar. 28, 2014 in Chinese Patent Application No. 201210042901.8 w/English-language Translation.
Japanese Patent Office, Notification of Reasons for Rejection mailed Jul. 1, 2014 in Japanese Patent Application No. 2011-072132 w/English-language Translation.
May 3, 2013 Written Opinion issued in Singapore Application No. 201201271-2.

* cited by examiner

FIG.15A
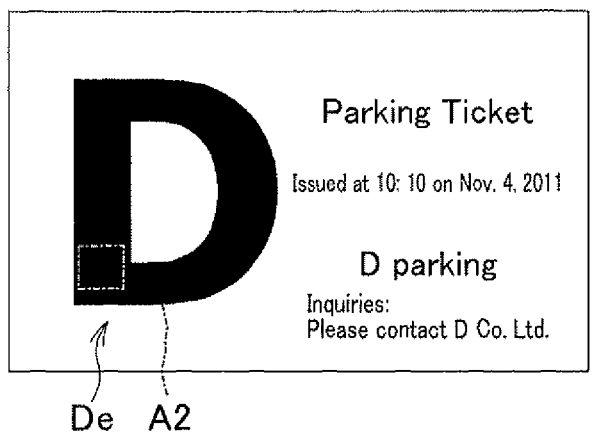
FIG.15B
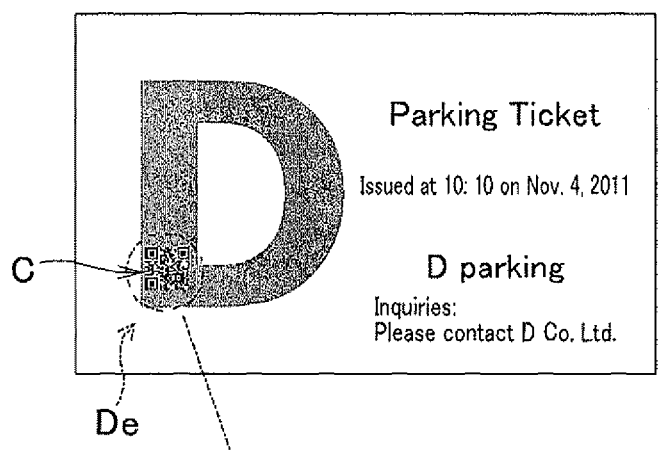
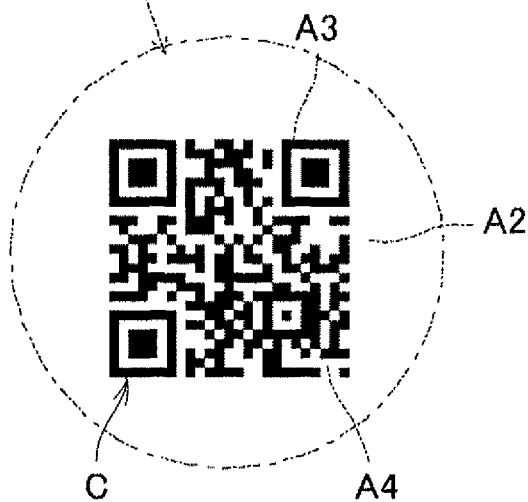

SYSTEM FOR READING INFORMATION CODE AND MEDIUM ON WHICH INFORMATION CODE IS FORMED

CROSS-REFERENCE TO RELATED APPLICATION

This is a Continuation of application Ser. No. 13/307,436 filed Nov. 30, 2011. This application is based on and claims the benefit of priority from earlier Japanese Patent Applications Nos. 2010-267617 filed Nov. 30, 2010; 2011-72132 filed Mar. 29, 2010; and 2011-253938 filed Nov. 21, 2011, the descriptions of which are incorporated herein by reference.

BACKGROUND OF THE PRESENT INVENTION

1. Field of the Invention

The present invention relates to a system for reading an information code, an apparatus for reading an information code, and a medium on which an information code is formed, and in particular to the system, apparatus and medium directed to an information code with enhanced confidentiality.

2. Related Art

Various kinds of information codes, such as bar codes and two-dimensional codes including QR codes (registered trademark), are now used in various applications. The information codes are formed on (or in) various types of mediums (or objects) such as printed paper sheets and displayed screens, and present pieces of necessary information by encoded codes mapped thereon.

The applications of these codes are now becoming diversified. Among diversifications, there is a growing need for higher security of the information codes. That is, it is strongly demanded that it is possible to read out contents of an information codes only when a specific condition is met. As one of countermeasures for this demand, Japanese Patent Laid-open Publication No. 2010-146461 provides a technique of providing the information code with a security function.

Practically, the technique provided by the foregoing publication is that key information is overlapped and printed on main data by using printing liquid visible only under ultraviolet rays. According to this printing technique, the key information cannot be visible under visible light rays, increasing the security of the code data encoded on a predetermined manner.

However, the printing technique provided by the foregoing publication still has a drawback about an operator's visible viewing of the key information for reliable confirmation. Specifically, by this printing technique, the key information is converted to numerical data and added, and an operator is requested to visibly view the numerical data under ultraviolet rays. The drawback is that whether or not the operator is able to visibly view the key information reliably largely depends on environments (such as printing environments and reading environments) and configurations of a code (such as a code size and how the key information is configured).

Especially when the information code is desired to be compact in size, there often occurs a situation where an operator cannot visibly view the key information though a reader can read the encoded code data itself. In such a case, the operator cannot obtain the key information, failing in decoding the encoded code data. In addition, the operator should read the code data and the key information overlapped on one the other, whether the information code can finally be read successfully depends on experience of the operator. This makes it difficult to read the information code in a quick and reliable manner.

SUMMARY

In consideration of the foregoing situations, it is desired to provide an information code which cannot be read by a general reader but can be read by a specific type of reader. It is also desired to provide an information code which cannot be copied in an undesired manner.

The present disclosure provides a system for reading an information code, comprising: a reader; and a medium on or in which an information code is formed, the information on code having light modules and dark modules. The reader comprises illuminating means for emitting illumination light; imaging means for imaging the medium to which the illumination light is emitted by the illuminating means; and decoding means for extracting and decoding the information code from an image of the medium obtained by the imaging means. The medium has inversion areas and non-inversion areas, the inversion areas i) presenting reflection characteristics on one of a dark color and a light color when light of a first wavelength band including at least a visible light band is emitted to the medium and ii) presenting reflection characteristics on the other of the dark color and the light color when light of a second wavelength band different in wavelengths from the first wavelength band is emitted to the medium, the non-inversion areas iii) presenting the reflection characteristics on the one of the dark color and the light color when the light of the first wavelength band is emitted to the medium and iv) representing the reflection characteristics on the one of the dark color and the light color when the light of the second wavelength band is emitted to the medium. Either of the light modules and the dark modules of the code are made of one of the inversion areas and the non-inversion areas, and the other modules of the light modules and the dark modules of the code are made of the other of the inversion areas and the non-inversion areas. The illuminating means includes a second illumination light emitting means emitting the illumination light of the second wavelength band toward the medium. The imaging means is configured to image the medium in a state where the light of the second wavelength band is emitted to the medium. The decoding means is configured to detect, from the image, the inversion areas and the non-inversion areas differentiatedly so as to extract the areas of the light modules and the dark modules and to decode the information code based on extracted results.

It is preferred that the illuminating means includes, in addition to the second illumination light emitting means, a first illumination light emitting means emitting the illumination light of the first wavelength band to the medium; and the imaging means is configured to image the medium in a state where the light of the second wavelength band and the light of the first wavelength band are emitted to the medium.

The present disclosure also provides that a system for reading an information code, comprising a reader; and a medium on or in which an information code is formed, the information on code having light modules and dark modules. The reader comprises: illuminating means for emitting illumination light; imaging means for imaging the medium to which the illumination light is emitted by the illuminating means; and decoding means for extracting and decoding the information code from an image of the medium obtained by the imaging means. The medium has inversion areas and non-inversion areas, the inversion areas i) showing dark reflection characteristics when light of a first wavelength band including at least a visible light band is emitted to the medium and ii) showing light reflection characteristics when light of a second wavelength band different in wavelengths from the first wavelength band is emitted to the medium, the non-inversion areas iii) showing the dark reflection characteristics when the light of the first wavelength band is emitted to the medium and iv) showing the dark reflection characteristics when the light of the second wavelength band is emitted to the medium. The areas of the light modules are produced as the inversion areas and the areas of the dark modules are produced as the non-inversion areas in at least part of an area in which the information code is formed on the medium, the information code being prevented from being decoded when the inversion areas are recognized as dark areas. The illuminating means includes a second illumination light emitting means emitting the illumination light of the second wavelength band toward the medium. The imaging means is configured to image the medium in a state where the light of the second wavelength band is emitted to the medium. The decoding means is configured to detect, from the image, the inversion areas and the non-inversion areas differentiatedly so as to extract the areas of the light modules and the dark modules and to decode the information code based on extracted results.

BRIEF DESCRIPTION OF THE DRAWINGS

In the accompanying drawings:

FIGS. 15A and 15B are illustrations exemplifying information-code-formed mediums used in other embodiments of the present invention;

DETAILED DESCRIPTION OF PREFERRED EMBODIMENTS

Referring to the accompanying drawings, a system for reading an information code (hereinafter referred to as an information code reading system) according to various embodiments of the present invention will now be described, in which a medium on which the information code according to the present invention is formed is used.

First Embodiment

Referring to FIGS. 1 to 11, an information code reader according to a first embodiment (and modifications) of the present invention will now be described.

Figure 1:
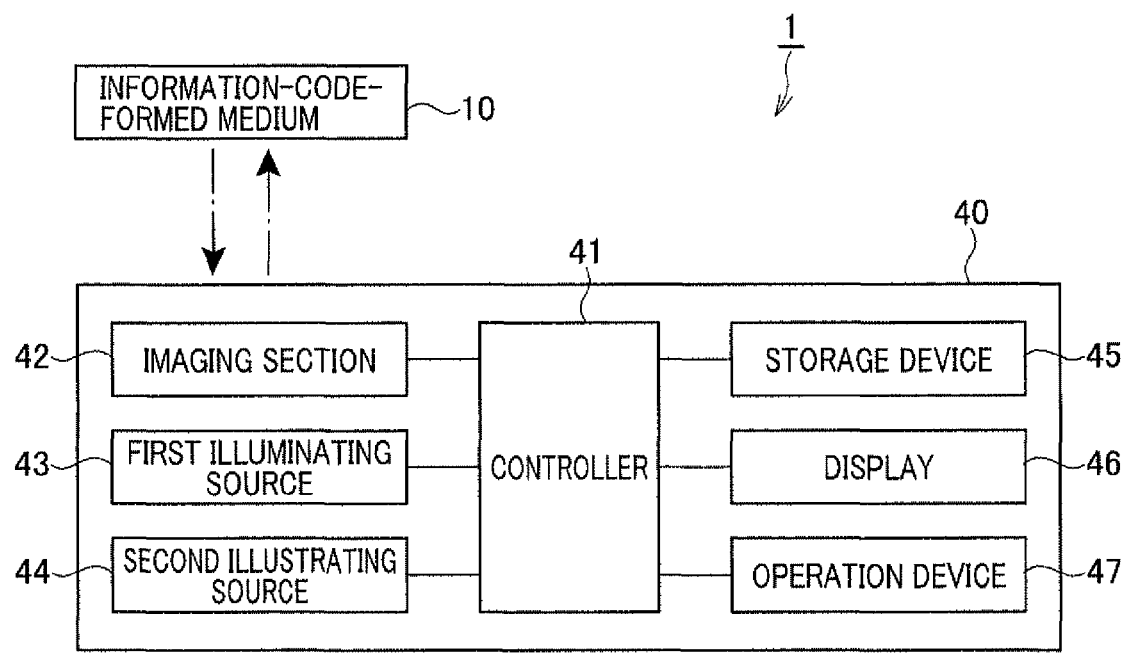
FIG. 1 is a block diagram conceptually explaining an information code reading system according to a first embodiment of the present invention.

First the information code reader will now be outlined in its conceptual configuration. FIG. 1 outlines the conceptual configuration of an information code reader 1 according to the first embodiment.

As shown in FIG. 1, the information code reader 1 is directed to a medium 10 on which information coded C having light color modules and dark color modules (refer to FIGS. 2 and 3) are formed, and includes an information code reader 40 (simply, a reader) which reads the information codes C on the medium 10. The information code reader 40 extracts data from the read codes C and decodes the extracted data, so that the apparatus 40 can output information based on decoded data. Hereafter the medium 10 and the reader 40 will now be detailed.

Figure 2:
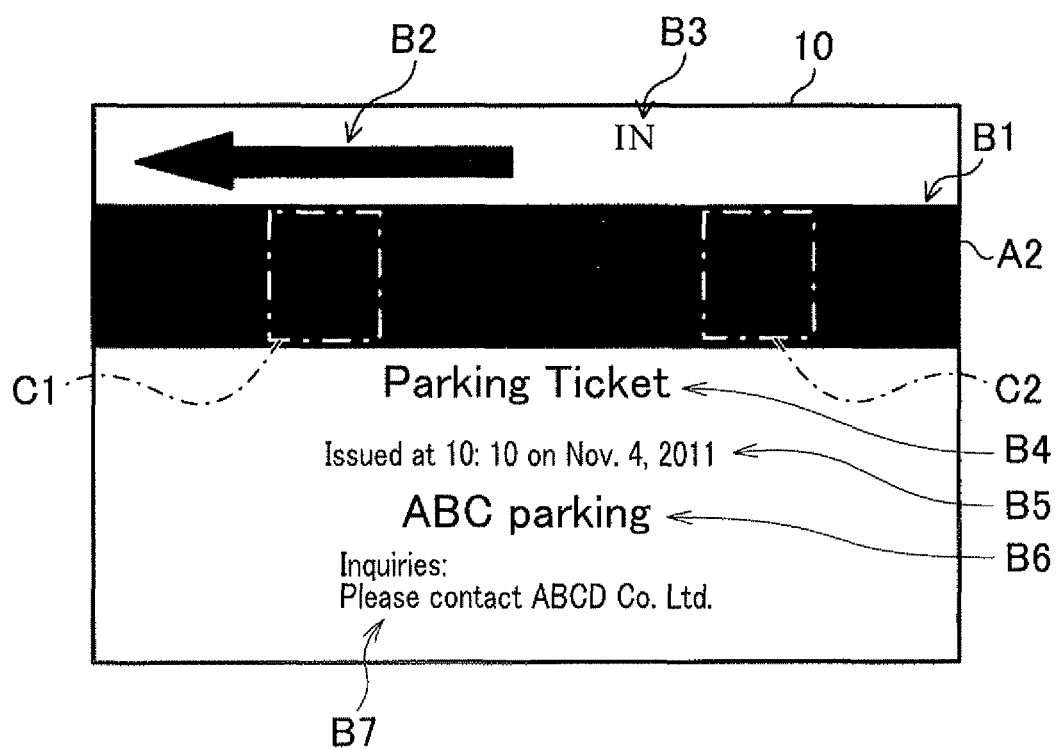
FIG. 2 is an illustration outlining an embodiment of an information code used in the information code reading system.

FIG. 2 exemplifies the information-code-formed medium 10 used by the information code reading system shown in FIG. 1.

The information-code-formed medium 10 is an object on or in which an information code(s) C is formed (produced, mounted, mapped). The object may be paper sheets, resin members, metal members, or display members. Each information code C is a set of encoded data and can be one-dimensional codes such as bar codes, two-dimensional code such as QR (quick response) Codes©, data matrix codes and maxima codes, or partially non-disclosed codes later described. The information code C can be decoded using a know decoding method.

As shown in FIG. 2, the information-code-formed medium 10 has code-formed areas C1 and C2 in each of which the information code(s) C is formed (or mapped) and a background area A2 in which characters, figures, symbols or designs are formed (or depicted). The code areas C1 and C2 and the background area A1 are overlapped on one the other. In the normal use state where visible light is dominant in imaging the code C, the code-formed areas C1 and C2 are overlapped and unified with the background area A2, making it difficult to visibly understand the code itself. In FIG. 2, the positions of the code-formed areas C1 and C2, which are located in the background area A2, are pictorially depicted by dashed lines. Incidentally the number of information codes may also be one, or three or more in number.

The information-code-formed medium 10 also includes areas B1 to B7 in which characters, figures, symbols, designs and others are drawn are divided into inversion areas and non-inversion areas. The inversion areas show reflection characteristics on a dark color (called "dark reflection characteristics") when light having a predetermined first wavelength band including at least a visible light wavelength band is emitted, while the inversion areas show reflection characteristics on a light color (called "light reflection characteristics") when light having a predetermined second wavelength band is emitted. The first wavelength band is different from the second wavelength band. Meanwhile, the non-inversion areas express the reflection characteristics of the dark color when the light having the first wavelength band is emitted, and also express the reflection characteristics of the dark color when the light having the second wavelength band is emitted.

Figure 4A:
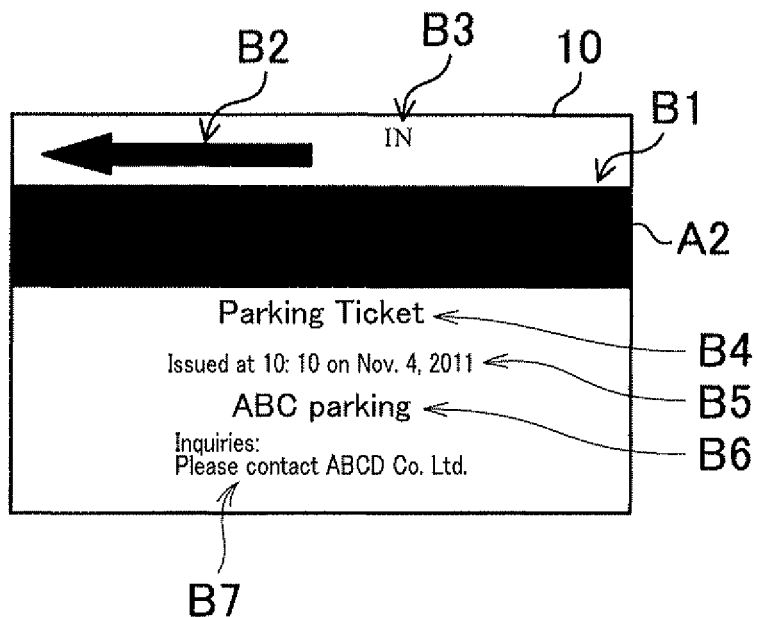
FIG. 4A is an illustration explaining an image of an information-code-formed medium shown in FIG. 2, which is imaged by a general-purpose reader.

The information code(s) C formed on the medium 10 has the areas A3 composed of dark modules (i.e., dark-color cells in FIG. 4B for example), where the areas A3 are formed as the non-inversion area. The information code C also has the area A4 composed of light modules (i.e., light-color cells in FIG. 4B), where the areas A4 are formed as the inversion area. In addition, in this medium 10, the background area A2, which is one of the inversion areas, is formed to entirely surround both the code-formed areas C1 and C2. Thus, when a general-purpose reader which radiates the visible light as illumination light toward the code, the areas A4 of the light modules, the areas A3 of the dark modules, and the background A2 all are imaged as one dark area, as shown in FIG. 4A, thereby making it difficult to optically pick up the contents of the information code(s) C. On the other hand, as will be described later, a reader 40 is formed to radiate the illumination light having the second wavelength band for imaging the code. Hence, this apparatus 40 is used, the areas A4 of the light modules and the background area A2 are imaged lightly, i.e., inversed into light-color images and the areas A3 of the dark modules are still imaged as dark images. This allows the information code C to be imaged, resulting in extracting the contents of the code(s) C.

Figure 3:
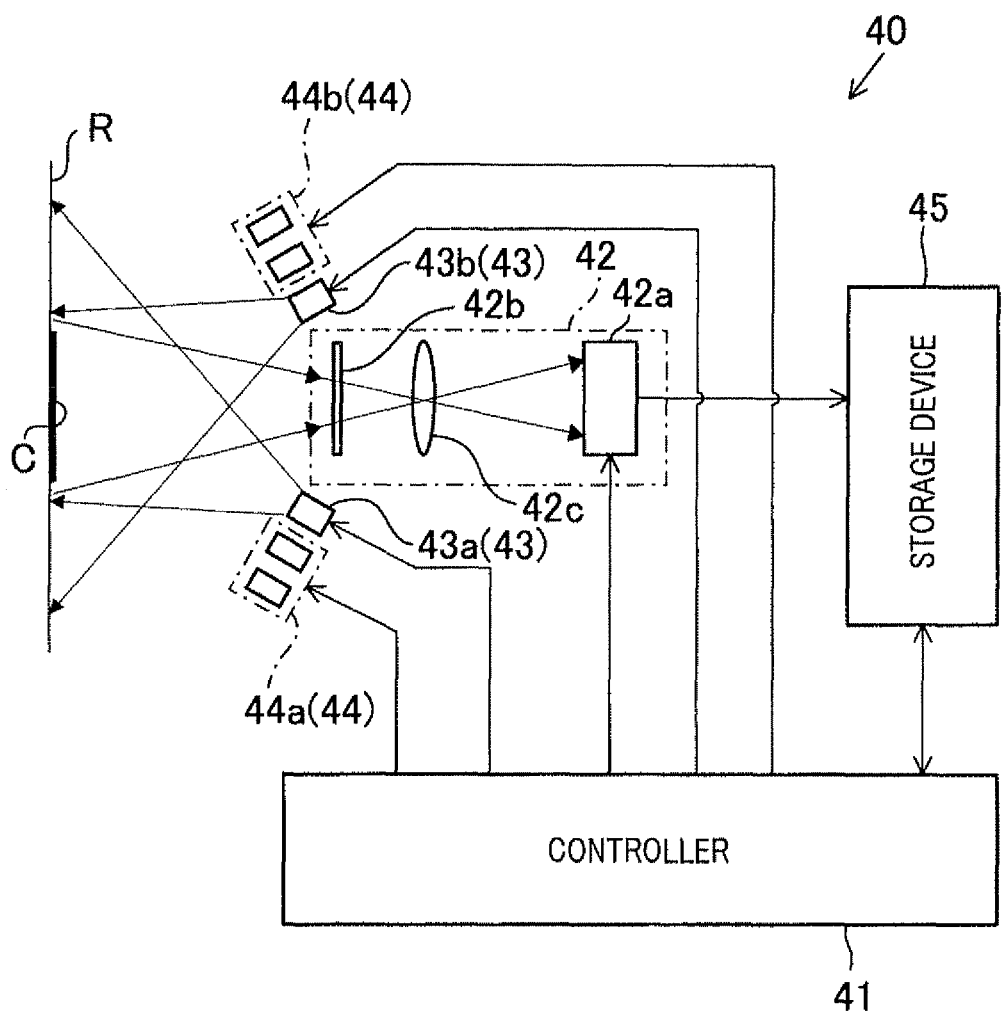
FIG. 3 is a block diagram outlining an essential part of an information code reader used in the information code reading system.
Figure 4B:
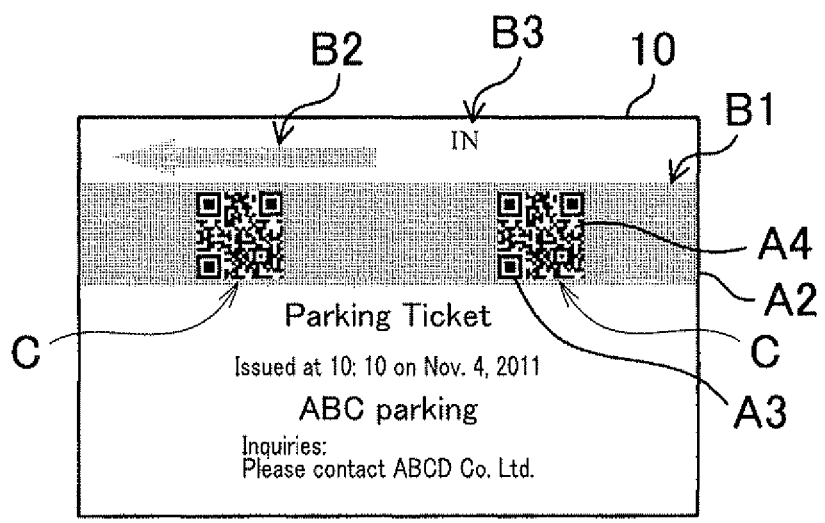
FIG. 4B is an illustration explaining an image of the information-code-formed medium shown in FIG. 2, which is imaged by the information code reader shown in FIG. 3.

FIG. 3 outlines in block form the information reader, which can image an information-code-formed medium shown in FIG. 2 and provide an image shown in FIG. 4B. FIG. 4A explains, in contrast to FIG. 4B, an image of the medium shown in FIG. 2, which image is imaged by a general-purpose reader.

The reader 40, which is exemplified as an optical information reader, is configured to image information codes such as a QR Code® and read out information contained in the codes. This reader 40 is provided with an imaging section 42 functioning as an optical camera, a first illuminating source emitting the light of the first wavelength band, a second illuminating source emitting the light of the second wavelength band, and a storage device 45. Of these members, the imaging section 42 has a controller 41 having a CPU, a ROM, and a RAM, and a light sensor (such as a C-MOS area sensor or a CCD area sensor). The storage device 45, which functions as storage means, has a ROM, a RAM, and/or a non-volatile memory. The reader 40 is additionally provided with a display 46 which is for example a liquid crystal display instrument and an operation device 47 having a key board.

The imaging section 42 is optically arranged between a pair of the first illuminating sources 43a and 43b. This imaging section 42 has the light sensor 42a which receives light reflected from the code-formed medium 10 such that the reflected light focuses on the light receiving surface of the light sensor, and produce image data of the medium 10. The light sensor 42a can receive the reflected light, and is a linear sensor or an area sensor in which light-receiving elements are arrayed linearly or two-dimensionally. The light-receiving elements are for example solid-state image sensing devices composed of elements such as C-MOS or CCD. The imaging section 42 includes an imaging lens 42c, which is composed of a plurality of collecting lenses mounted in a not-shown lens barrel. This imaging lens 42c optically provides an image of the information code C on the light receiving surface of the light sensor 42a, and output an image signal corresponding the optically collected image. The image signal from the storage device 45 is stored in an image data storage area in the storage device 45.

In the present embodiment, the imaging section 42, which functions as imaging means, can image the information-code-formed medium 10 emitted by illumination light from the illuminating means. Practically, the imaging section 42 is produced to image the medium 10 in the state where the two types of illuming light of the first and second wavelength bands are emitted to the medium 10.

As shown in FIG. 3, the first and second illuminating sources 43 and 44 are composed of two sources 43a, 43b and 44a and 44b respectively and compose the illumination light source (i.e., illumination light system). Each of the first illuminating sources 43a and 43b and each of the second illuminating sources 44a and 44b are located at both end sides of the imaging section 42 (i.e., light receiving system) in a one direction passing through the imaging section. The paired first illuminating sources 43a and 43b are provided as LEDs each emitting visible light of a wavelength band from 380 to 750 nm for example. Meanwhile the paired second illuminating sources 44a and 44b are provided as LEDs each emitting infrared light of a wavelength band of 750 nm or higher. In the embodiment, the second illuminating sources 44 (the second illumination light emitting means) is larger in the number of light sources than the first illuminating sources 43 (the second illumination light emitting means).

In the present embodiment, both the first and second illuminating sources 43 and 44 compose illuminating means. The first illuminating source 43 exemplifies a first illumination light emitting means, and emits the illumination light of the first wavelength band toward the medium 10. Similarly, the second illuminating source 44 exemplifies the second illumination light emitting means, and emits the illumination light of the second wavelength band toward the medium 10.

The storage device 45 is provided as a semiconductor memory device, which has for example RAMs (such as DRAMs, SRAMs, and others) and ROMs (such as EPRPMs, EEOROMs, and/or others). In the RAMs of this storage device 45, there are formed memory areas with which the controller 41 uses for various types of calculation including arithmetic operations and logical operations, in which a reading condition table is implemented, and into which the foregoing image data are stored. In the ROMs, there are previously stored predetermined programs for various processes and system programs for controlling hardware devices including the illumination light sources and light sensor 42*a*.

The controller 41 is composed of a microcomputer or an operation device which can control the overall reader 40, and includes a CPU, a system, and an input/output interface to have an information processing function. In the present embodiment, the controller 41 functionally provides interpreting means, which extracts and interprets contents of data contained in the information code C, from an image of the medium 10. Concretely, this functional interpreting means detects distinguishably data of the inversion and non-inversion areas in an image of the medium 10 imaged by the imaging section 42, thereby extracting light and dark module areas. Using such extracted results, the functional interpreting means interprets data of the information code C.

How to produce the information-code-formed medium 10 will now be described.

Though there are variety of types of practically configuring both inversion and non-inversion areas on the medium 10, the description herein adopts as a representative a configuration shown in FIG. 7 and using this figure, how to produce both inversion and non-inversion area will now be described.

Figure 7:
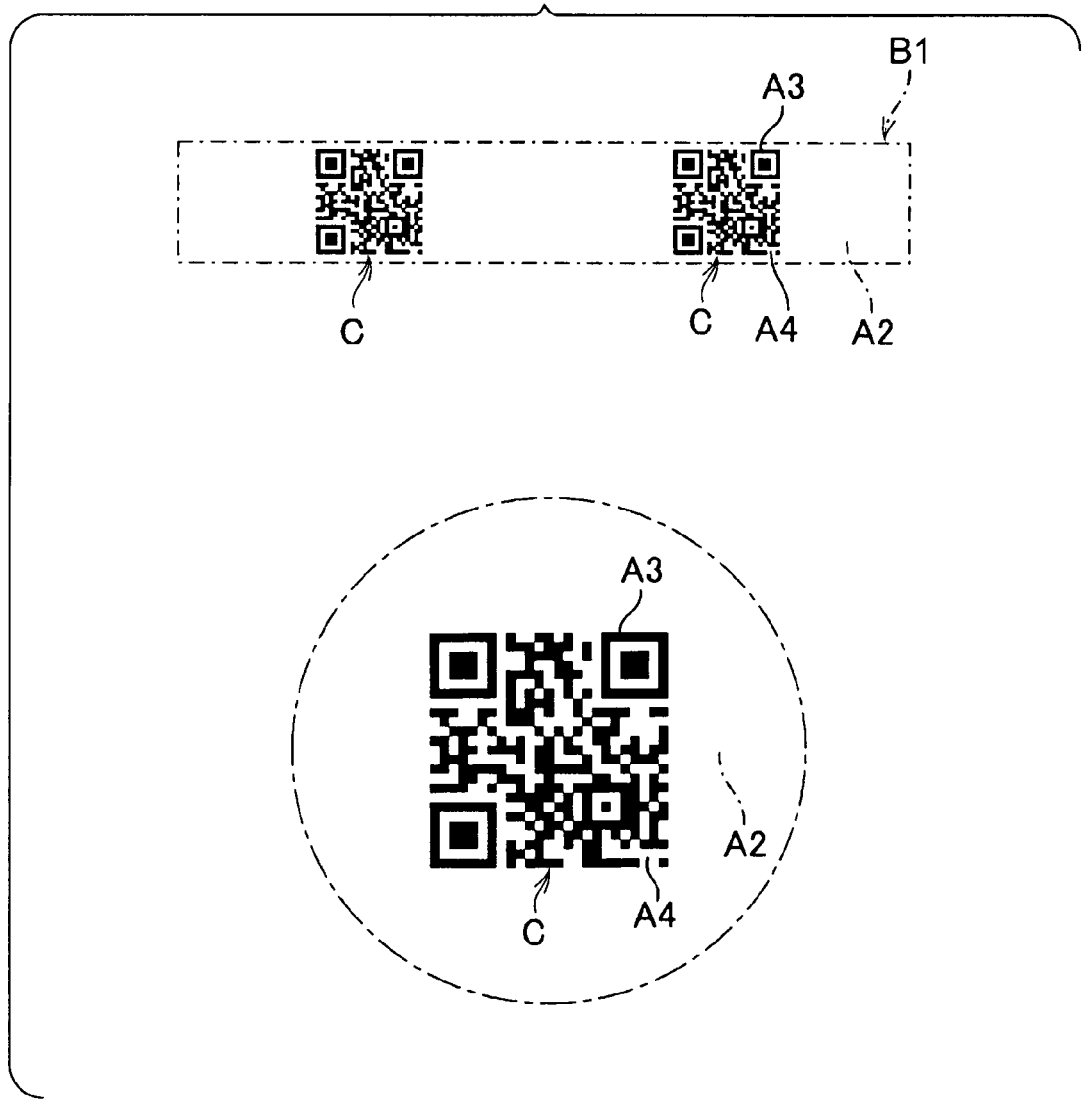
FIG. 7 is an illustration, with an enlarged view of part thereof, explaining information-code formed areas and a background of the medium shown in FIG. 2.

In the upper part of FIG. 7, the area B1, which is conceptually drawn by a chain line, shows an information code and others mapped in this area. The lower part of FIG. 7 shows an enlarged view of part (a code portion on the right side) of the upper part of FIG. 7. In FIG. 7, the areas showing the dark modules are colored in black, while the areas showing the light modules and background is colored in a light color (in their inversely reflected states). In the example shown in the lower part, the characters, figures, symbols and designs on the medium 10 are made of a first type of ink D1 and a second type of ink D2, for example. The inversion areas are made of the first type of ink D1. By contrast, the non-inversion areas are made of the second type of ink D2 or produced by overlapping areas made of the first type of ink D1 and areas made of the second type of ink D2 on one the other.

The first type of ink D1, which exemplifies a first coloring medium, shows the dark reflection characteristics when being emitted by the light of the first wavelength band and shows the light reflection characteristics when bending emitted by the light of the second wavelength band. That is, the areas made of the first type of ink D1 are turned from the dark color into a light color (or a highly optically clear state). Practically, the first type of ink D1 is composed of ink visible under infrared light, and practically, substantially turned into an invisible state or a light color state when infrared light of a wavelength of 750 nm or higher is emitted to the areas made of the first type of ink. In the present embodiment, the characters, figures, symbols, designs or others are made of the first and second type of inks on a light-color object (e.g. a white, yellow, or lightly colored objet, which is for example a sheet of paper).

The second type of ink D2, which exemplifies a second coloring medium, shows the dark reflection characteristics when being emitted by the light of the first wavelength band and shows also the dark reflection characteristics when bending emitted by the light of the second wavelength band. Practically, this second type of ink D2 is made of normally used ink which does not show the inverted reflection to the infrared light. Hence, the areas made of this ink D2 provide the dark reflection (for example, the reflection in black, blue, or indigo blue) in both cases when such areas are emitted by the visible light of a wavelength of 380-750 nm and the infrared light of a wavelength of 750 nm or higher.

In the example shown in the lower part of FIG. 7, the dark modules, that is, the dark cells, of the information code C are mapped using the second type of ink D2. All the areas of the dark modules made of the second type of ink D2 are overlapped on the area made of the first type of ink D1 such that the latter is enclosed by the former.

Figure 6:
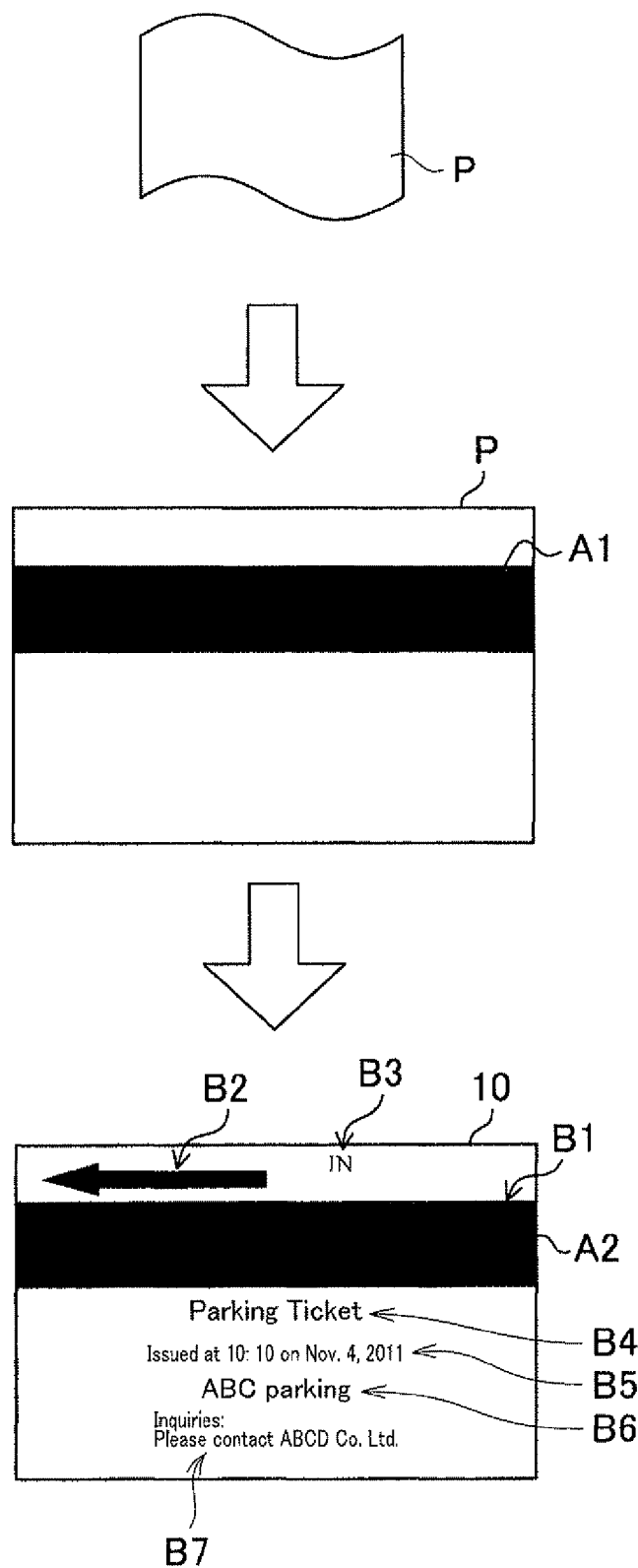
FIG. 6 is an illustration outlining a method of producing the medium shown in FIG. 2.

The code portion shown in the lower part of FIG. 7 can be produced using a printing process shown in FIG. 6. First, a paper medium P, such as roll paper, is prepared. Then, a first inked region A1, which has an elongated shape and made of the first type of ink D1, is formed on the paper medium P, as shown in the middle part of FIG. 6. After this, at the positions corresponding to the areas C1 and C2 shown in FIG. 2, the dark module areas A3 is formed on the first inked region A1 using the second type of ink D2. When the dark module areas are formed (overlapped) on the first inked region A1 as shown in the lower part of FIG. 6, the dark module areas A3 are visually hidden in the first inked region A1, preventing the dark module areas from being visually observed.

In this production, the dark module areas A3 (i.e., the areas of the dark cells) are made of overlapped layers of the first and second types of ink D1 and D2, while the light module areas A4 (i.e., the areas of the light cells) are made of only the first type of ink D1. In addition, the background area A1 surrounding the information code C is also made of only the first type of ink D1. In this case, the pieces of information, B2-B7, are made of the second type of ink D2 and formed on the background area A1.

For forming the figures on the medium 10 as shown in FIG. 6, a paper medium P which is thermal paper is first prepared, and the first elongated inked region A1 is formed on the paper medium P by using the first type of ink D1, as shown in the middle part of FIG. 6. After this step, the dark module areas A3 are formed at the predetermined positions of the code-formed areas A1 and A2 (refer to FIG. 2) in the first inked region A1 by using a thermal technique.

Figure 8:
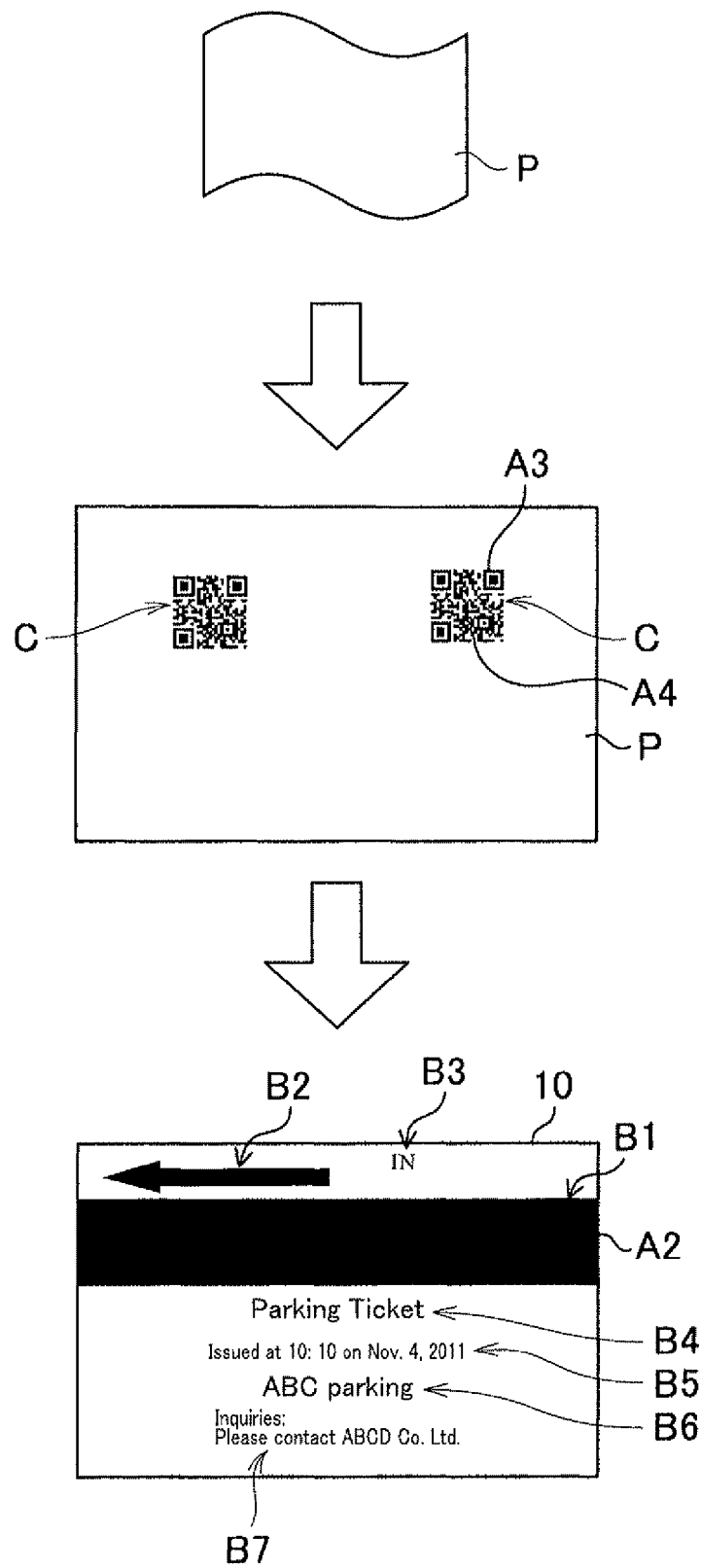
FIG. 8 is an illustration outlining another method of producing the medium shown in FIG. 2.

Instead of using the printing technique, another printing process shown in FIG. 8 may be used to produce the information-code-formed medium 10. In this printing process, a paper medium P, which is also roll paper, is first prepared, and the dark module areas A3 are formed using the second type of ink D2, before printing the first inked region. After printing the dark module areas, the first type of ink D1 is used to form the first inked region such that the first inked region covers the entire dark module areas made of the second type of ink D2. In this way, the first inked region is overlapped on the dark module areas, thus providing the medium structure shown in the lower part of FIG. 8 where the dark module areas are visually hidden in the first inked region.

Figure 9:
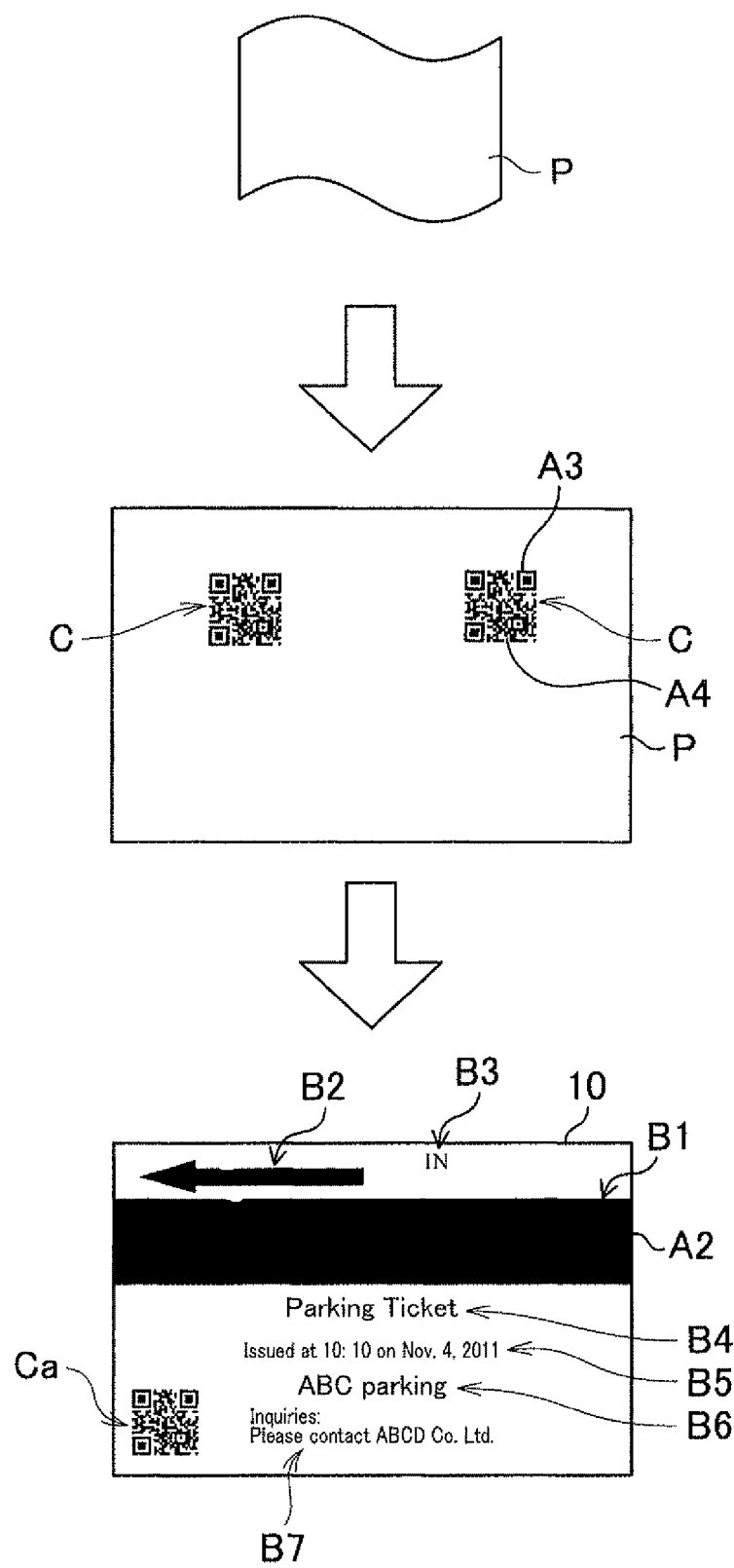
FIG. 9 is an illustration outlining still another method of producing the medium shown in FIG. 2.

The above printing process may be performed as illustrated in FIG. 9, which exemplifies a partially non-disclosed code which also functions as an information code C. This partially non-disclosed code has a non-disclosed region in which data encrypted based on a predetermined encryption key and a disclosed region in which disclosed data which are not encrypted. Hence, this partially non-disclosed code can be decrypted by only a reader 40 which has a decryption key corresponding to the encryption key. By contrast data mapped in the disclosed region of this partially non-disclosed code can be read by a reader with no decryption key. Various data which has no problem if being disclosed to third parties can thus be contained in the disclosed region.

How to produce the partially non-disclosed code and its practical configuration are already provided by for example Japanese Patent Laid-open Publication Nos. 2009-9547 and 2008-299422. As shown in these publications, "disclosed codes" recorded in the disclosed region are codes encoded according to JIS, the basic specification (JISX0510:2004). Additionally "secret codes" are codes also encoded from encrypted data according to JIS, the basic specification (JISX0510:2004). The encrypted data are data produced by encrypting critical data such as information on individuals.

The foregoing known publications Nos. 2009-9547 and 2008-299422 provide a configuration where secret data recorded in the non-disclosed region include a decryption key or a decryption key inspection data by which a decryption key can be specified. Instead of this, the decryption key or the decryption key inspection data may not be included in the non-disclosed region. How to produce the partially non-disclosed code and its practical configuration are not limited to the above described ones, but any other techniques can be adopted if decrypted data and non-decrypted data can be mapped in different regions in an information code.

In the example shown in FIG. 9, additionally to the information code C (partially non-disclosed code) hidden in the background area A2, there is formed a second information code Ca memorizing data such as loading time. In this code configuration, there can be set a condition that the second information code Ca is allowed to be used only when the information code C is first encoded. Such a condition prevents unauthorized use reliably, because the medium 10 cannot be utilized as long as the information code is not encoded even when the second information code Ca is copied illegally.

A practical example of how the information code reading system 1 is used will now be described.

Figure 10:
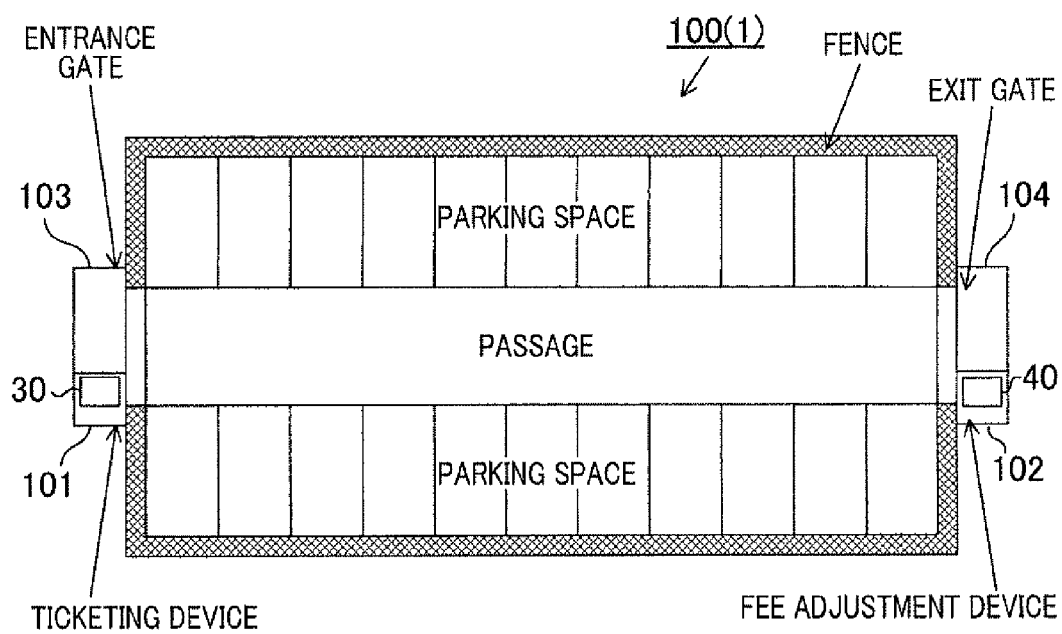
FIG. 10 is an illustration explaining a practical example to which the information code reading system according to the first embodiment is applied to a parking management system.

FIG. 10 exemplifies a parking management system 100 to which the information code reading system 1 is applied. As shown in FIG. 10, a parking facility includes an entrance gate 103, a ticketing device 101, parking spaces, a passage, fences, an exit gate 104, and a fee adjustment device.

Figure 5:
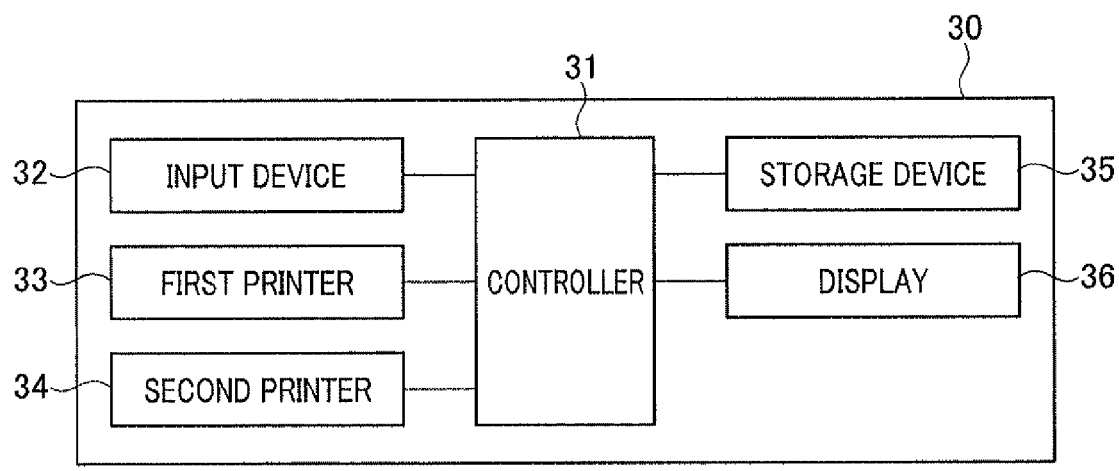
FIG. 5 is a block diagram explaining an outlined configuration of a forming apparatus for forming the medium shown in FIG. 2.

The ticketing device has a medium producing device 30 producing an information-code-formed medium 10 configured as shown in FIG. 5 using any one of the forming methods shown in FIGS. 6 to 9. The fee adjustment device 102 includes a reader 40 configured as shown in FIGS. 1 and 3. When a user requests the ticketing device 101 to issue a parking ticket at the entrance gate, the ticketing device 101 issues the parking ticket. This ticket is produced as the foregoing information-code-formed medium 10 with the foregoing information code C at which information of an entrance time is recorded.

Figure 11:
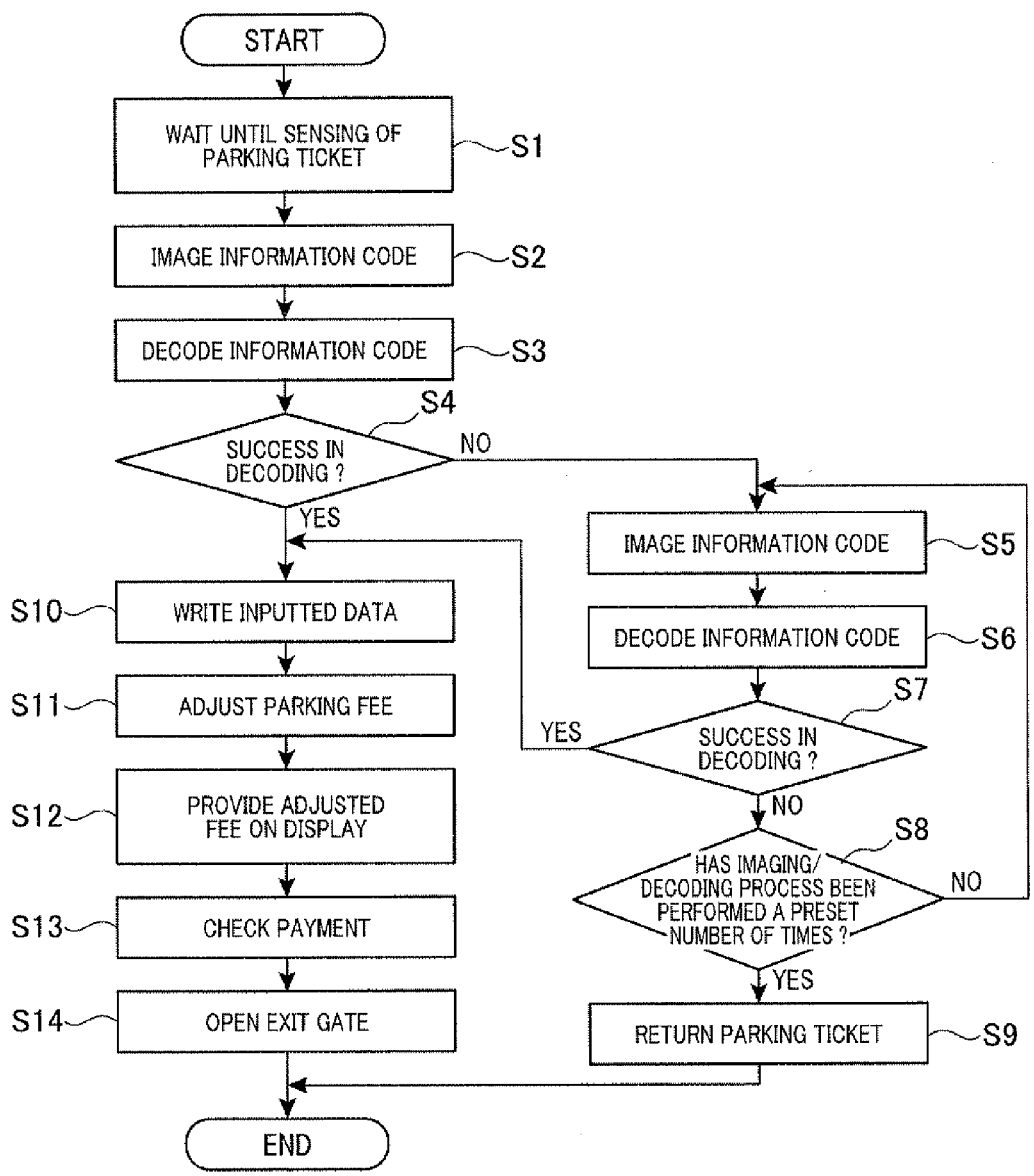
FIG. 11 is a flowchart exemplifying a flow of parking fee adjustment necessary in the parking management system.

When the user exits from the parking, the fee adjustment device 102 (i.e., the reader 40) performs a process for fee adjustment by a flow shown in FIG. 11. In this process, there is a waiting step to wait for a parking ticket from a not-shown insertion opening of the device 102 (step S1). When sensing the insertion of a parking ticket, the ticket (that is, the information-code-formed medium 10 with the information code C recorded thereon) is imaged by emitting the illumination light of the first and second wavelength bands, as described before (step S2). In response to this light emission, the inversion areas of the medium 10 is inverted in their reflection characteristics, the dark modules formed by the non-inversion areas come to appear in the imaged view. Hence, this imaged view is used to decode the information code C (step S3). When succeeding in decoding the code C, the determination at step S4 is YES, while not succeeding in the decoding, the determination at step S4 is NO.

When NO at step S4, i.e., fail in the decoding, the parking ticket (i.e., the medium 10) is imaged again (step S5), and encoding the information code C is tried to be decoded again (step S6). When succeeding in decoding the code C at step S6, the determination at step S7 is YES, while not succeeding in the decoding at step S6, the determination at step S7 is NO. The steps S5 to S7 are repeated a preset number of times. When the number of repeated times finally reaches the preset number of times, the determination at step S8 is YES, ending the process.

Meanwhile it is determined that the encoding process at step S4 or S7 has succeeded, inputted data (that is, data read out from the information code C) are written (step S10) to adjust or calculate a parking fee. The information code C memorizes the loading time etc., so that a fee is calculated based on the loading time (at step S11). The calculated fee is then displayed on the fee adjustment device 102 (step S12). It is then determined whether or not the fee, which is displayed, has been paid (step S13), and when completing the fee adjustment, the exit gate 104 is opened (step S14).

The information code reading system 1 is constructed as described, so that the system 1 provides various advantages. In the normal use state where the light of the first wavelength band (i.e., the visible light) is emitted to the information-code-formed medium 10, the light and dark modules on the medium 10 show the same reflection characteristics. Hence, when a user views the medium 10, the user visually recognizes the information code C and its surrounding area as a dark area or a light area as a whole. Additionally, when a general-purpose optical reader is used to try to read the information code C, it is impossible to read out data implemented in the code C, because emitting only the visible light results in that the information code C is viewed as a dark area or a light area as a whole. It is therefore very difficult to a user to understand that the information code C itself is mapped on the medium 10 in the normally used state. This means that, in most cases, the user cannot read visually the information code C. Alternatively, if a normally used optical reader which is now commercially available, which is different from the reader provided in the present embodiment, is used to try to read the information code C, the code C cannot be read, thereby greatly enhancing security of the code C.

By contrast, the information code reader 40 according to the present embodiment can image the information-code-formed medium 10 with the illumination light of the second wavelength band emitted to the medium 10. Hence, in a resultant imaged view, the inversion areas are inverted and the non-inversion areas are not inverted in their reflection characteristics. In other words, in the imaged code view, of the two types of the light and dark modules, one type of modules is inversed and the other type of modules is not inverted. Thus it is possible that the reader 40 can clearly distinguish one type of modules from the other type of modules. Furthermore, the illumination light of the first wavelength band as well as that of the second wavelength band are emitted for the imaging, whereby an inverted image of the inversion areas and a non-inverted image of the non-inversion areas can be obtained more clearly.

The encoding means detects both the inversion and non-inversion areas in the resultant image of the medium differently from each other, being allowed to distinctly extract areas of the light and dark modules, encoding the information code for both the areas. Thus the information code can be encoded more reliably.

The number of light sources for the second illuminating source 44 is larger than that for the first illuminating source. This makes it possible to invert the inversion areas in their optical reflection characteristics in a more reliable manner, highly raising the reading accuracy of the information code C.

Additionally, in the information-code-formed medium 10 according to the present embodiment, the dark modules are set to the non-inversion areas, while the light modules are set to the inversion areas, as described. Thus, in cases where the light of the first wavelength band (i.e., the light including the wavelengths of visible light) is emitted to the medium 10, both of the light and dark modules of the information code C present the dark reflection characteristics. The entire information code is imaged as being immersed in a dark area by the information code reader 40, so that it is difficult to the reader 40 to identify that the information code C is mapped on the medium 10.

On the other hand, in the code image imaged by the information code reader 40 emitting the light of the second wavelength band, the light modules show the inversion in their reflection characteristics so as to provide a light color, and the dark modules show no inversion in heir reflection characteristics, providing a dark color. The dark modules can be visually distinguished from the light ones in the sense of imaging using the light of the second wavelength band. This allows the information code to be read clear and reliably.

In addition, in the medium 10 according to the present embodiment, the background area A2 is formed around the code-formed areas C1 and C2 in which the information code C is formed. The background area A2 consisting of the inversion and non-inversion areas is formed to be continuous from the code-formed areas C1 and C2. Hence, in a case where there is no emission of the illumination light of the second wavelength band, the code-formed areas C1 and C2 and the background area A2 show the same reflection characteristics, providing no visual distinction between the code-formed areas C1 and C2 and the background area A2. It is thus difficult to visually identify the positions of the information code C, enhancing security for the code C.

In the present embodiment, the medium 10 is produced using the thermal paper and the information code C is formed on the thermal paper by thermal print. The background area A2 is formed using ink materials. Hence, after forming the information code C, the code C can be made unclearly or deleted over time. This is advantageous in enhancing security of the information code C, because it becomes gradually more difficult to know the contents of the code C as the time elapses.

Furthermore, the dark modules of the information code C are made of the second coloring medium showing the dark reflection characteristics for the light of the first and second wavelength bands. All the areas of the dark modules are located within and overlapped on the area made of the first coloring medium showing the dark and light reflection characteristics for the two types of light of the first and second wavelength bands respectively.

In this case, the code-formed areas C1 and C2 of the information code C are entirely immersed in the area made of the first coloring medium, making it difficult to users to visually find out the positions of the information code.

In one modification of the present embodiment, the information code C is exemplified as a partially non-disclosed code. Hence, the information code can be made difficult to find out the position thereof in the daily-use normal state, giving an enhanced security to the code and raising secrecy to the data itself of the information code. This surely prevents data from leaking from the information code unwillingly.

Second Embodiment

Referring to FIGS. 12A and 12B to 15 as well as FIGS. 1-9 described already, the information code reading system according to a second embodiment (and modifications) of the present invention will now be described.

In the second embodiment, the components identical or similar to those described in the first embodiment will be given the same reference numerals for the sake of simplifying descriptions thereof.

Figure 13:
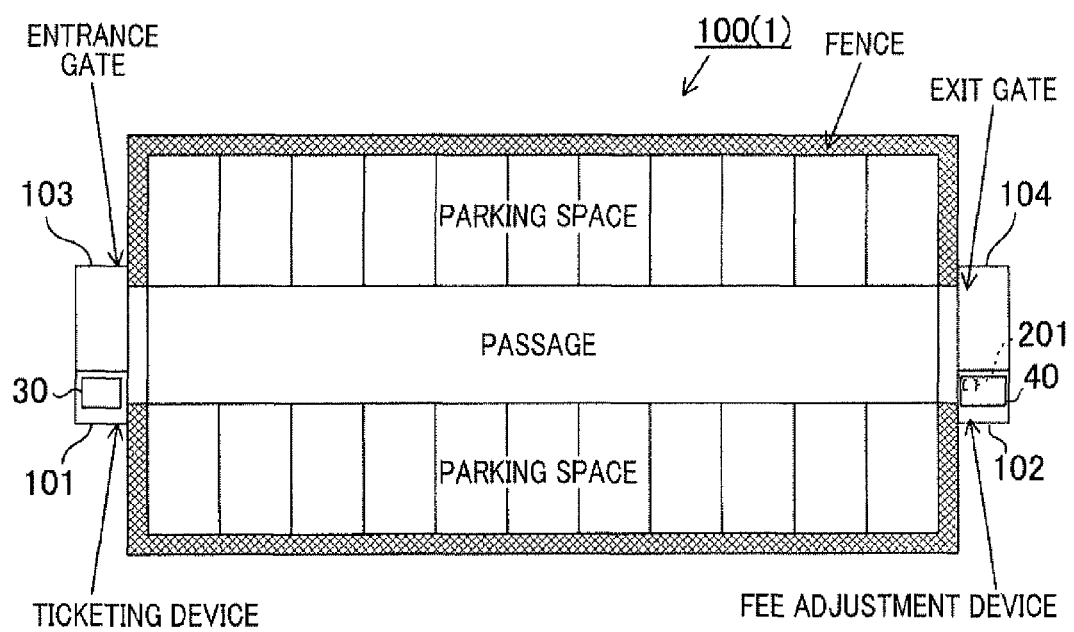
FIG. 13 is an illustration explaining a practical example to which the information code reading system according to the second embodiment is applied to a parking management system.
Figure 14:
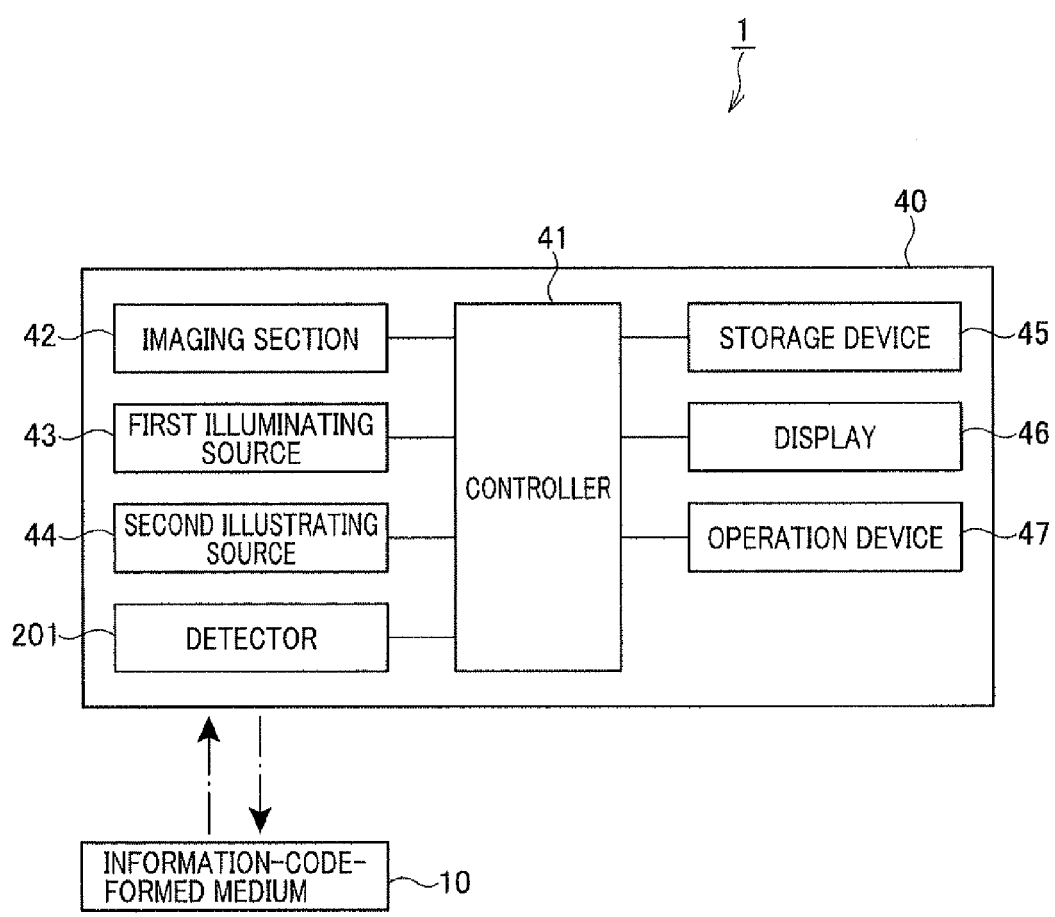
FIG. 14 is a block diagram showing an electrical configuration of the information code reading system according to the second embodiment.

An information-code-formed medium employed by the second embodiment is similar to that described in FIG. 9, but has an additional component, as will be detailed later with FIGS. 12A and 12B. In this embodiment, the information code reading system is also applied to the parking management system which is additionally provided a detector 201, as shown in FIGS. 13 and 14.

Figure 12A:
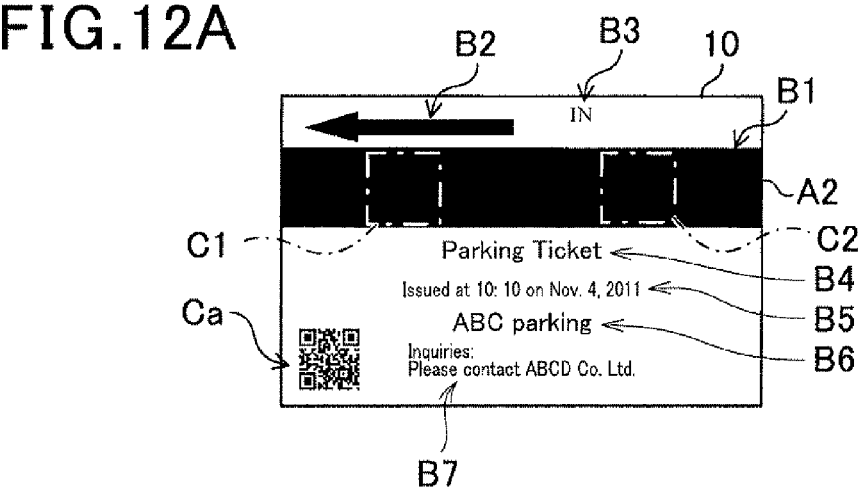
FIG. 12A is an illustration outlining an example of an information-code-formed medium used in an information code reading system according to a second embodiment of the present invention.

FIG. 12A shows an information-code-formed medium 10, in which a second information code Ca is added, but the other components such as the areas C1, C2, A2, B1-B7 are the same as those shown in FIG. 2, thus omitting those areas from being detailed.

Figure 12B:
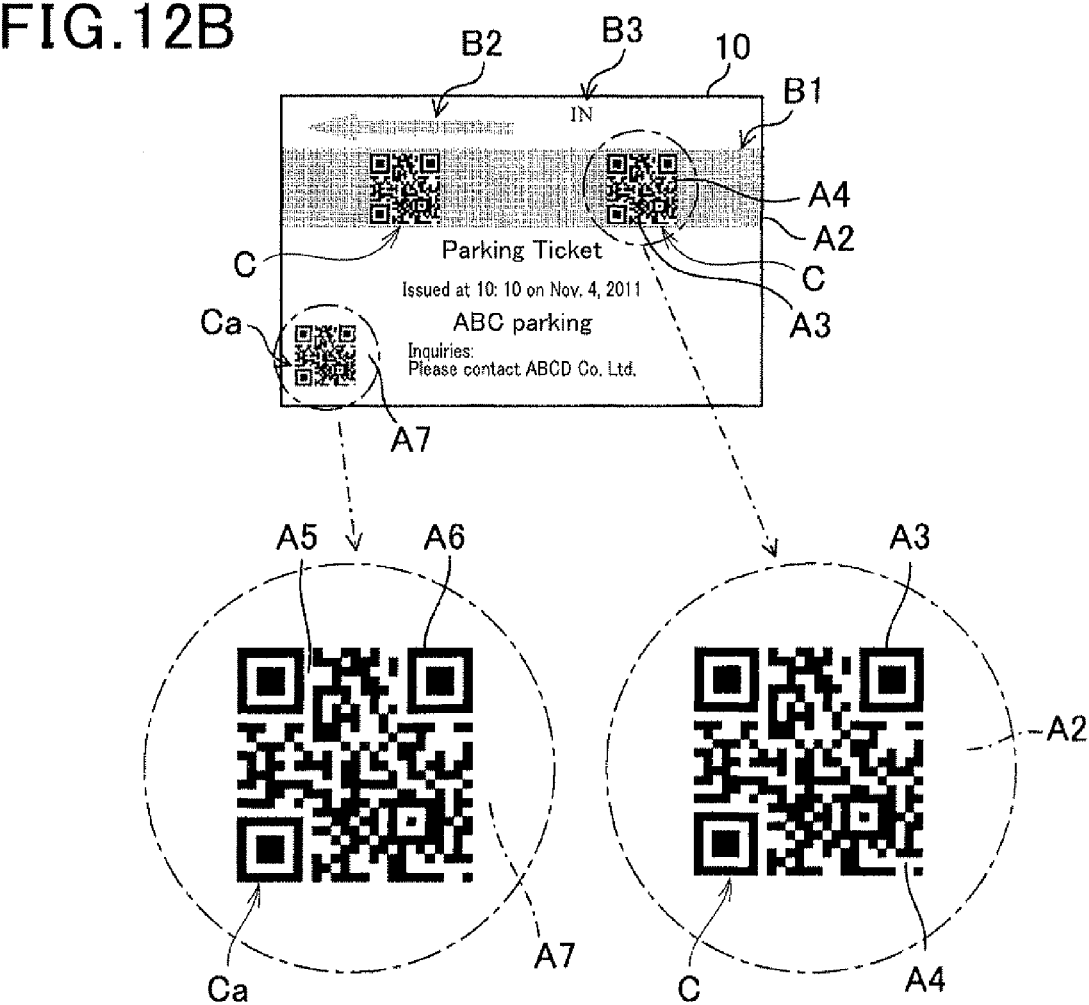
FIG. 12B is an illustration explaining an image of the medium shown in FIG. 12A, which is imaged by the reader shown in FIG. 3.

As shown in FIG. 12B, the second information code Ca is formed in an area of the medium 10, which area is positionally different from the background area A2, that is, the information code(s) C. This second information code Ca also consists of light modules A and dark modules A6 which are arrayed two-dimensionally in a combined manner according to encoding. The light modules A5 are formed to show light reflection characteristics when receiving the light having the first wavelength band including visible-light wavelengths. In contrast, the dark modules A6 are formed to show the dark reflection characteristics when receiving the light having the first wavelength band including visible-light wavelengths.

A background area A7 is formed around the second information code Ca as shown in FIG. 1B. This background area A7 is formed to show the dark reflection characteristics when receiving the light having the first wavelength band including visible-light wavelengths.

Hence, in the normally used environment in which the visible light is dominant as light, users can view the medium 10 and can visually notice the presence of the second information code Ca. Moreover, the information code reader 40 can image both the light and dark modules A5 and A6 in a mutually differentiated mode when the illumination light of the first wavelength range including visible light wavelengths is emitted to the medium 10 from the first illuminating source 43. Then the imaged view can be decoded.

In the information code reader 40 used in the present embodiment, both the first and second illuminating sources 43 and 44 simultaneously emit the first and second types of illumination light at given timings. This allows the medium 10 to simultaneously receive the illumination light of the first and second wavelength bands (i.e., the visible light and infrared light). During this simultaneous emission of the two types of light, the imaging section 42 images the medium 10, and extracts both of the information code(s) C and the second information code Ca for decoding thereof.

In the following, the above imaging and decoding processes are applied to the parking management system 100 shown in FIG. 13, which will now be described.

The parking management system 100 shown in FIG. 13 is provided with the same components as those in the first embodiment, except for the fee adjustment device 102. This fee adjustment device 102 has the reader 40 configured as shown in FIG. 14. Incidentally the entrance gate 102 has the medium producing device 30 configured as shown in FIG. 5 to produce the medium 10 using the code forming method shown in FIG. 9. Hence, at the entrance gate 102, like the manner in the first embodiment, a user can receive an issued parking ticket configured as the information-code-formed medium 10 shown in FIG. 12, in response to an user's request.

In contrast, the fee adjustment process carried out by the fee adjustment device 102 at the exit gate 104 is similar to that shown in FIG. 11.

The information code reader 40 shown in FIGS. 13 and 14 is modified from that described in the first embodiment. Practically, in order to detect the presence of the parking ticket (i.e., the information-code-formed medium 10), the detector 201 is arranged. The detector 201 is provided as a sensor that detects, for example, a state where a user tries to make the reader 40 read the medium 10 inserted by the user, or a state where a user accesses the reader 40. That is, the detector 201 is for example a nearby sensor sensing such states. In response to sensing the presence of the medium 10, the detector 201 provides the controller 41 with a corresponding detection signal, whereby the controller 41 is able to recognize a fact that the medium 10 is present at a position within a preset detectable range of the detector 201, which is located nearby the reader 40.

In the present embodiment, the detector 201 and controller 41 functionally constitutes recognition means for recognizing the presence of the medium 10.

In the second embodiment, the fee adjustment process is performed by the fee adjustment device 102 shown in FIG. 11. In a similar way as that described in the first embodiment, the step S1 for recognizing the parking ticket (i.e., the medium 10 provided by a user) is followed by the imaging process at step S2. In this imaging process, both of the first and second illuminating sources 43 and 44 are driven in parallel such that the visible light (which is at least part of the first illumination light) and the infrared light (which is at least part of the second illumination light) are emitted in parallel for a certain period of time. During such a parallel light-illuminated state to the medium 10, the imaging section 42 images the medium 10.

Then the process is shifted to step S3, where the information code C and the second information code Ca both are extracted from the imaged view of the medium 10, and the extracted data of both types of codes are subjected to decoding. In the present embodiment, both dark modules A3 of the information code C and the dark modules A6 of the second information code Ca are produced to be dark (black), which absorbs the infrared light for instance. Hence, even when the infrared light is emitted or the visible light is emitted, the imaging of the codes C and Ca cannot be transparent, so that both codes are imaged in a dark color (e.g. black) which is distinguishable in the sense of colors.

The light modules A4 of the information codes C and the background area A2 the surrounding the information codes C are produced to be dark (black) but do not to absorb the infrared light. As a result, as shown in FIG. 12B, the imaging of those areas is made to be transparent so that both areas are inverted to a light color in the imaging. Practically, only the areas of the dark modules A3 of the information codes absorb the infrared light to be dark (black). And the dark (black) layers which do not absorb the infrared light is overlapped on such areas absorbing the infrared light, with such areas shielded. Accordingly, when performing imaging under the infrared light, the dark (black) areas which do not absorb the infrared light becomes transparent, while only the dark (black) areas which absorb the infrared light (that is, the dark modules A3 of the information codes C) can appear in imaging. In the present embodiment, the light modules A5 of the second information code Ca and the background area A7 surrounding thereof are produced not to absorb the infrared light and to be light (white or others), for example.

Furthermore, the dark modules A3 of the information codes C and the dark modules A6 of the second information code Ca are made of the same type of ink (that is, ink that absorbs light of a dark color (such as black). Hence, when not only the illumination light of the first wavelength band (including visible light wavelengths) is emitted but also the illumination light of the second wavelength band (in this embodiment, the infrared light wavelengths) is emitted, there are no inversion of light reflection characteristics at both the dark modules A3 and A6, thus enabling those modules to be imaged in a clear dark color (such as back).

The second embodiment is able to provide the advantages identical to those in described in the first embodiment. Additionally, as shown in FIGS. 12A and 12B, the codes which requires the illumination light of the second wavelength band (the infrared light) in imaging, which are the information codes C which require use of the information code reader 1 shown in FIG. 1, and the code which can be read by a known general optical reader, that is, the second information code Ca, can be produced on the same medium 10. That is, the same medium 10 can be used in common for the different two types of codes C and Ca. This provides the medium 10 with a high convenience. For instance, the information code C can be used to record therein information having higher levels of importance or secrecy, while the second information code Ca can be used to record therein information having lower levels of importance. Regarding the reading process, the information code C is allowed to be read only by an authorized system (that is, a system equipped with the information code reader 1 shown in FIG. 1), and the second information code Ca is allowed to be read by general-purpose known systems other than such an authorized system.

In addition, in the present embodiment, images of both two types of information codes C and Ca, which differ in their optical reflection characteristics from each other, can be obtained in parallel in their decodable states in which the light and dark patterns are differentiated from each other. Besides a higher convenience described, the time to read the codes can be shortened in comparison with a construction where the individual codes are imaged at different times.

In the present embodiment, the recognition means that recognizes the medium 10 is implemented in the information code reader 40. When this recognition means recognizes the presence of the medium 10, the light of the second wavelength band (i.e., the infrared light) is, at least, emitted.

In this way, the recognition of the presence of the medium 10 can be used as a trigger to emit the infrared light. This is helpful in saving the power for the emission.

On the other hand, the infrared light should be emitted to decode the information code C. At what timing this infrared light should be emitted is also an important factor in speeding up the reading process. In this regards, at the timing when the presence of the medium 10 with the information code C is recognized, the infrared light is emitted. Hence, the recognition timing can also be used as a trigger for getting ready for the reading process.

For example, to be specific, for the medium 10 on which the background area A2 is black and the information codes C are immersed (hidden) in this background area, the visible light is unavailable for reading the code. It is required to emit the infrared light (the illumination light of the second wavelength band). In this case, before emitting the infrared light, a specific pattern for recognizing the presence of the information code C cannot be found out, because the information codes C are immersed in the background. For example, the codes C are QR Codes® as shown in FIG. 12B, the specific pattern is known as a finder pattern. If the position of such a specific pattern cannot be found out, it cannot be checked if the information code C is located within an imaging range fixed in the reader.

However, the present embodiment can overcome such a drawback as well. Specifically, the infrared light is emitted when the presence of the medium 10 is recognized. This means that the infrared light can be emitted at timing when a possibility that the information code C comes in the imaging range is considerably high. Hence, with the power consumption saved, the reading can be completed as quickly as possible. At the same time, it is avoidable that the reader fails to detect the information codes C, that is, a situation where the decoding is not carried out even when the information codes C are present within the imaging range.

Further, the dark patterns of both of the information codes C and the second information code Ca are printed by using the same type of ink. Compared with printing such two types of codes with different types of ink, the number of types of ink can be reduced, lowering steps and cost for the production.

Third Embodiment

Figure 16:
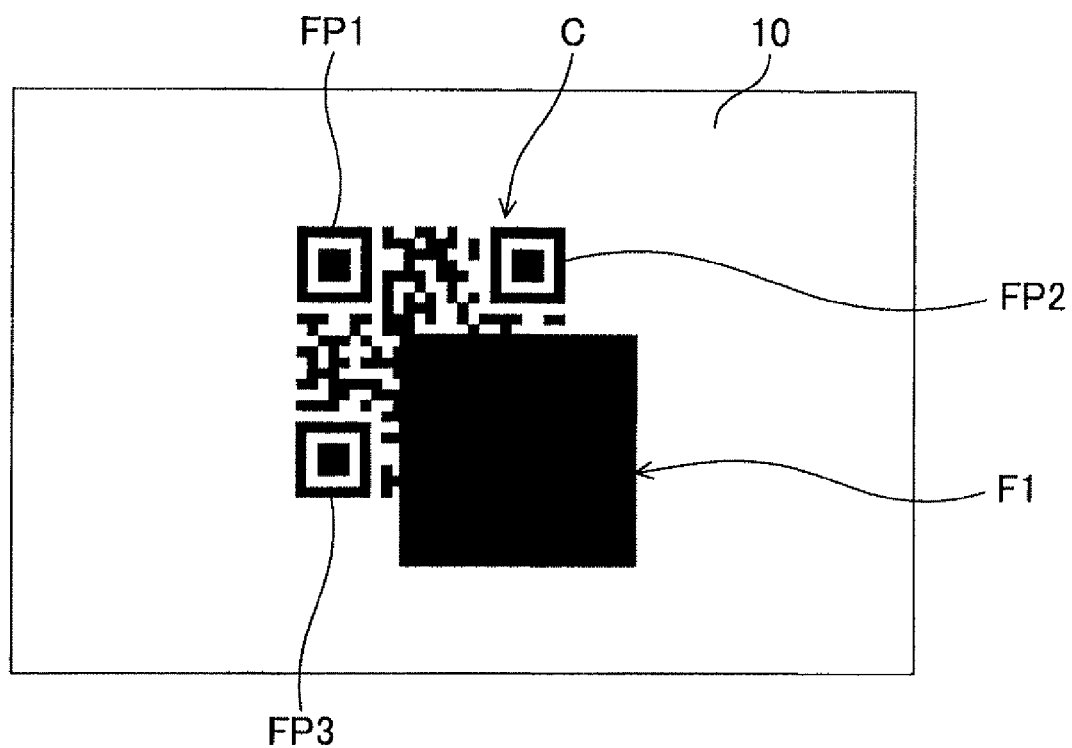
FIG. 16 is an illustration exemplifying an information-code-formed medium used in an information code reading system according to a third embodiment of the present invention.

Referring to FIG. 16 as well as FIGS. 1-15 described already, the information code reading system according to a third embodiment and some modifications of the present invention will now be described.

In the third embodiment, the components identical or similar to those described in the first embodiment will be given the same reference numerals for the sake of simplifying descriptions thereof.

The third embodiment provides an information-code-formed medium which is unique to this embodiment, and besides the format of this medium, the third embodiment is identical or similar in its configuration to those described in the first and second embodiments.

The information-code-formed medium according to the third embodiment is shown by a reference numeral 10 in FIG. 16. This medium itself is an object, which is for example flat and made of materials such paper, resin, or metal. An information code C is formed on the medium 10. This medium 10 can be used as admission tickets, railway tickets or others which require some security, and of course can be used as parking tickets exemplified in the foregoing embodiments.

In each of the examples shown in FIGS. 16 to 17A, 17B, the medium 10 has one information code C and one filled area F1 both formed thereon, with other elements such as characters, figures, symbols, designs and/or colored sections omitted from drawn. Of course, in addition to the code C and the filled area F1, such other elements can be added freely to the medium 10.

Figure 17A:
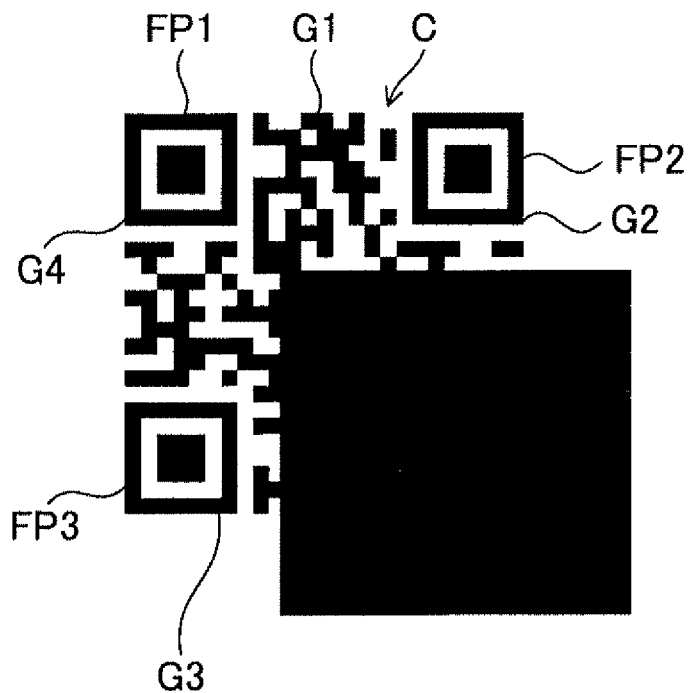
FIG. 17A is an enlarged view enlarging a portion of an information code on the medium shown in FIG. 16.

As shown in FIGS. 16 and 17A, the medium 10 is produced such that both areas of the information code C and the filled area F1, which is for example square, are partially overlapped on one the other. The filled area F1 is an area in which characters, figures, symbols, and/or designs are arranged. In the state where the light of the first wavelength band including the visible light is dominant, the information code C is viewed and recognized such that the code C is partially overlapped, i.e., covered by the filled area F1, as shown in FIG. 17A. By contrast, when the light of the second wavelength band including infrared light is dominantly emitted to the medium, inversion areas partially composing the filled area F1 are inverted into light areas, enabling the entire information code C to appear as originally drawn and to be recognizable.

Like the first and second embodiments, the information code C itself can be a one-dimensional code or a two-dimensional code such as a QR Code® or a partially non-disclosed code. These various types of codes can be decoded by known techniques. The present embodiment exemplifies the information code C which is a QR Code®.

The filled area F1 is divided into an inversion area and an non-inversion area. Like the first embodiment, the inversion area shows the dark reflection characteristics when the light of the first wavelength band is radiated, and shows the light reflection characteristics when the light of the second wavelength band is radiated. In contrast, the non-inversion area shows the dark reflection characteristics when both types of light of the first and second wavelength bands are emitted to the medium 10. These relationships between the light reflection characteristics and the light wavelength bands are the same as described.

Figure 17B:
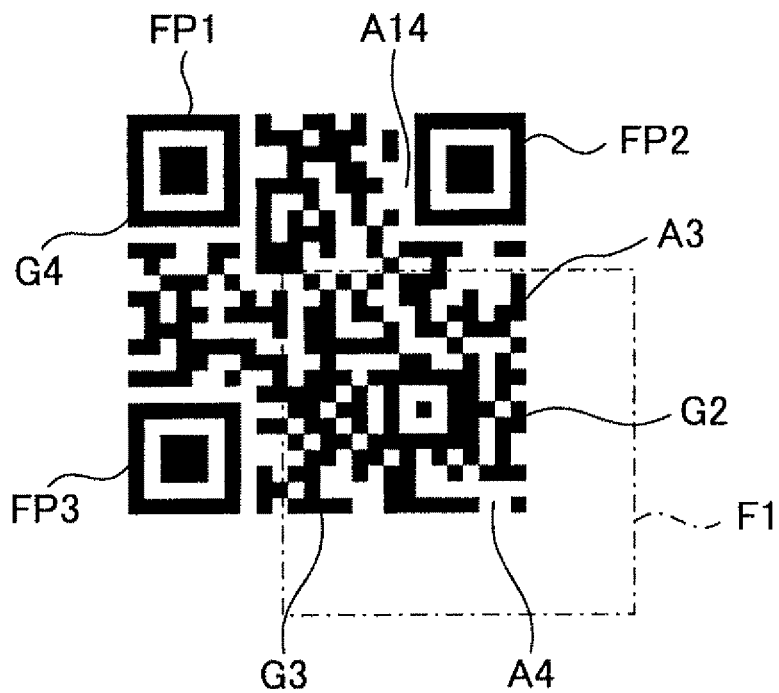
FIG. 17B is an illustration showing the portion of the information code, which can be viewed when illumination light of a second wavelength band is emitted thereto.

As shown in FIG. 17B, part of an area of the information code C, which is overlapped with the filled area F1, has dark modules areas A3 and light module areas A4 (in FIG. 17B, depicted as cells). These dark module areas A3 are produced as non-inversion areas, while the light module areas A4 is produced as inversion areas.

Hence, as shown in FIG. 17A, when a known optical reader that emits only the visible light as the illumination light is used, the part of the information code C that is overlapped with the filled area F1 is imaged such that all of the light and dark module areas A4 and A3 (refer to FIG. 12B) are in a dark color. It is therefore difficult to extract respective modules in this overlapped partial area. The filled area F1 has a size part of which is overlapped with the part of the information code C. The size of the filled area F1 is set such that the part of the filled area F1 makes difficult to decode the information code C when the filled area F1 is viewed in a dark color. Practically, when the entire filled area F1 is recognized as being dark, the filled area F1 is subjected to an error correction process in decoding the information code C. With consideration for this process, the size of the filled area F1 is decided such that the overlapped partial area on the information code C is larger than an area which enables the error correction process.

Accordingly, the general optical reader that does not emit the light of the second wavelength band (mainly the infrared light) cannot correct an error in the black area, that is, the overlapped partial area. It is thus difficult decode the contents of the code.

In contrast, when employing the reader 40 detailed in the first embodiment, the infrared light can be emitted to the information code C. In response to this emission, as shown in FIG. 17B, the light module areas A4 and an L-shaped region outside the code within the filled area F1 are turned to a light color, with the dark module areas A3 remaining in dark. Due to this light reflected state, the entire information code C can be imaged, whereby the information code C can be decoded reliably.

In the remaining area other than the filled area F1 in the information code C is formed by a known method and has dark and light modules whose areas are produced as the non-inversion areas. That is, the dark module areas show the dark color reflection for the emission of the light of the first and second wavelength bands (i.e., for the visible and infrared light). The light module areas show the light color reflection for the emission of the light of the first and second wavelength bands. That is, only the light module areas A4 in the overlapped area of the filled area F1 are produces as the inversion areas, while, though the light module areas A14 in the remaining L-shaped region are not produced as inversion areas, such light module areas A14 are produced to show the light reflection characteristics under the emission of the light of the first wavelength band.

Additionally the configurations shown in FIGS. 17A and 17B includes feature pattern areas FP1 to FP3 each formed to have preset shapes and located at predetermined positions of the information code C. These pattern areas are shaped into a predetermined form regardless of being contents of the data contained in the code C. The QR Code® shown in FIG. 17 has four corners, and at three of which, the three feature pattern areas FP1 to FP3 serving as position detecting patterns. The filled area F1 is located so as to avoid those feature pattern areas FP1 to FP3, and the inversion areas are located at positions other than the feature pattern areas FP1 to FP3. The information code C is shaped into a square as a whole. The filled area F1 having the inversion areas and the dark modules continuously extends to cover both one edge G2 of the code C and another edge G3 adjacent to the edge G2.

In the medium 10 according to the third embodiment, the information code C and the filled area F1 or designed portions by characters, figures, symbols, and/or patterns (not shown in FIG. 16) are formed using the first and/or second types of ink, like the first embodiment. The first type of ink is made of ink material visible under the infrared light and the second type of ink is made of normally used ink material which do not show the inversion of the reflection characteristics to the infrared light.

Practically, for example, the inversion areas can be formed using the first type of ink only. The non-inversion areas can be formed using the second type of ink only or can be formed by mutually overlapping areas made of the first and second types of ink. More practically, the dark module areas of the information code C can be made of the second type of ink, while the light module areas A4 in the overlapped partial area between the code C and the filled area F1 and the remaining L-shaped area outside the code in the filled area F1 can be made of the only the first type of ink.

Alternatively, the areas of the dark module (the dark module areas) in the overlapped partial area between the code C and the filled area F1 may be formed by mutually overlapping areas made of the first and second types of ink or may be formed as areas made of only the second type of ink. The areas of the dark modules which are located outside the filled area F1 are formed using only the second type of ink, for example. In contrast, the areas of the light modules (the light module areas) located outside the filled area F1 are formed as areas with no ink coated, for example.

The foregoing information-code-formed medium 10 can be produced as follows. For example, a light-color paper sheet (for example, a white or yellow paper sheet) is prepared as a medium for a code C. The code C is printed on this light-color paper sheet by printing the second type of ink onto areas which should present the dark modules. After or before printing the code C, a filled area F1 is formed by printing part of the code C using the second type of ink. By this printing, the dark module (cell) areas A3 in the partially overlapped area between the information code C and the filled area F1 are formed as the overlapped areas made of the first and second types of ink, while the light module (cell) areas A4 are formed as the areas made of only the first type of ink. Further, the L-shaped area remaining in the filled area F1, which is located outside the partially overlapped area, is made of only the first type of ink.

How to read the code in the information code reading system according to the third embodiment will now be described.

In the present embodiment, like the foregoing embodiments, the information code reader 40 is used to read the medium 10. The illuminating means, imaging means, and decoding means are also provided similarly to the foregoing embodiments. When the medium 10 according to the present embodiment and modifications is employed by a parking management system, the reading process can be implemented as explained in the first or second embodiment, or can be implemented as will be explained using FIG. 18.

Figure 18:
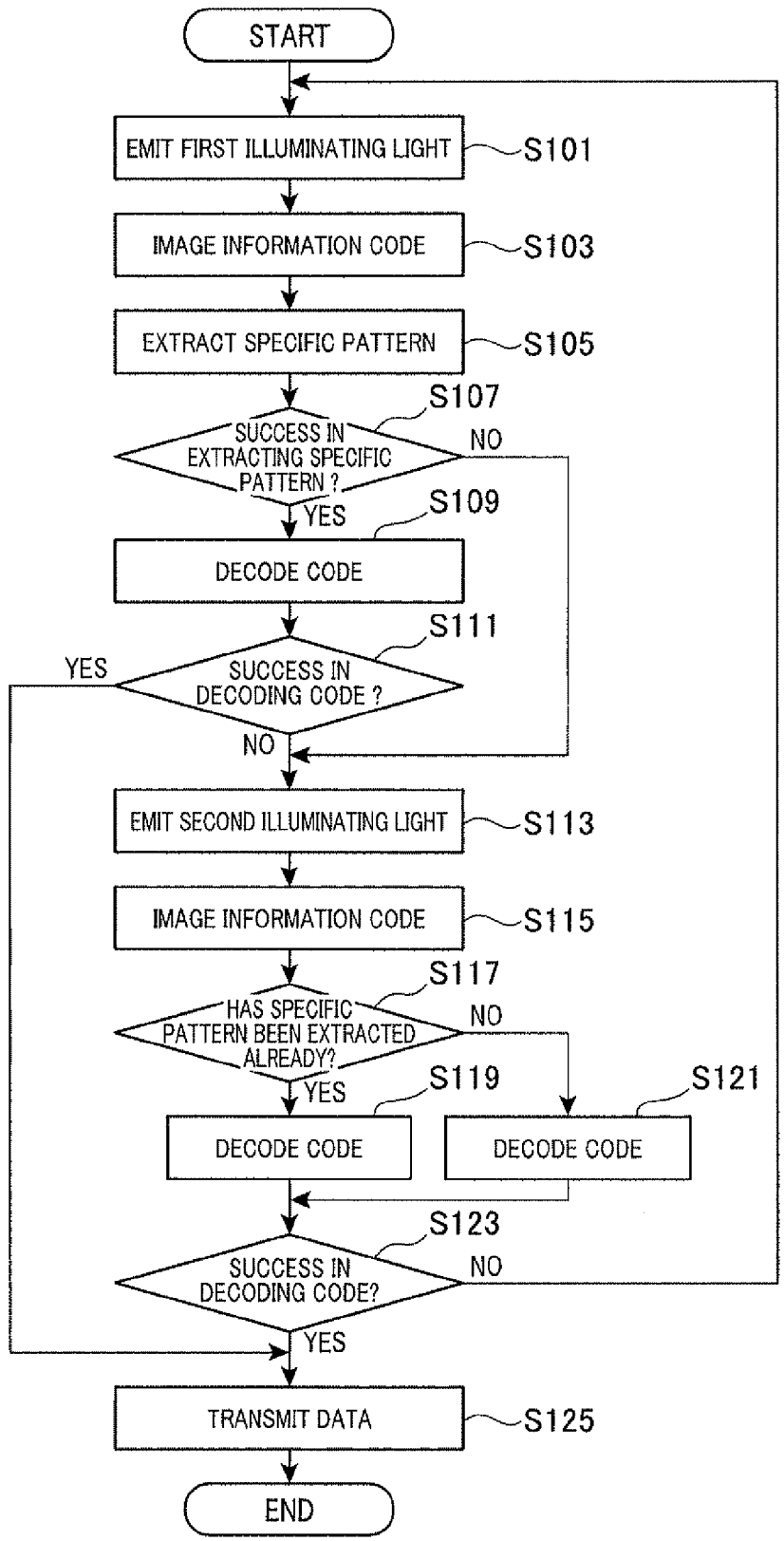
FIG. 18 is a flowchart exemplifying a reading process performed by an information code reader used in an information code reading system according to the third embodiment.

The reading process shown in FIG. 18 will now be explained. This process is activated when the detector (refer to the detector 201 shown in FIG. 14; another type of detector may be used) has detected that the code 10 is positioned at a preset position. When this reading process starts, the first illumination light is emitted from the first illuminating source 43 (step S101). Under this emission of the first illumination light, that is, there no emission of the second illumination light, the imaging section 42 performs imaging of the medium 10 (step S103).

From this imaged view of the medium 10, a known pattern detection method is used to detect the feature pattern areas (i.e., the position detecting patterns) FP1-FP3 (step S105). How to detect the feature pattern areas is ruled depending on types of information codes. For the QR Code®, a known detection method designated for the QR code is adopted to detect the position detecting patterns FP1-FP3. Then, it is determined whether or not the feature patterns have been detected successfully at step S105 (step S107). If the determination is YES at step S107, the processing shifts to step S109, where the information code C is subjected to decoding with a decoding method assigned to this type of the code C to be read. The successful decoding at step S109 reveals that there is no filled area on the code C. Hence, at the determination whether or not the decoding has been successful (step S111), the determination becomes YES thereat. Hence the decoded data is transmitted outside the reader and other necessary processes are performed (step S125), before completing the present reading process.

On the other hand, when it is determined NO at step S107 (that is, the extraction has been unsuccessful), or, when it is determined NO at step S111 (that is, the decoding has been unsuccessful), the processing proceeds to step S113, where the second illumination light is emitted by the second illuminating source 44. Under this emission of the second illumination light, but with the first illumination light stopped from being emitted from the emitted the source 43, the medium 10 is imaged by the imaging section 42 (step S115).

Then it is determined if or not the feature patterns had been extracted successfully at step S105 (step S117). If this determination is YES, i.e., successful, at step S117, the decoding is performed with the use of the exacted results of the features patterns obtained at step S105 (step S119). In this case, it is not needed to detect the positions of the feature pattern areas FP1-FP3 (in this case, the position detecting patterns), because such feature areas have already been known, speeding up the decoding process.

When it is determined that extracting the feature patterns have been unsuccessful at step S117, the decoding process is carried out (step S121). This decoding process includes a process to detect the feature pattern areas FP1-FP3. The step S119 or S121 is followed by a determination of whether or not the decoding process has been made successfully (step S123). When being successful, i.e., YES at step S123, the already described step at S125 is processed. By contrast, when being unsuccessful, i.e., NO at step S123, the processing returns to the foregoing steps S101 and subsequent steps for repetition.

Advantages obtained in the third embodiment are as follows. In the normal state where the light of the first wavelength band (i.e., the visible light) is dominant, both the light and dark modules in, at least, part of the code C on the medium 10 show the dark reflection characteristics. The code C includes the inversion areas, in which when the light modules are recognized as being dark, the modules cannot be decoded. Hence, the general reader which uses the reflection of the visible light cannot read the code C. That is, emitting only the visible light to the code C makes it impossible to invert the light module areas to being a light color (a bright color) (refer to FIG. 17A). At least, the light modules cannot be extracted even at the lowest luminance level which allows the decoding process. As a result, even when an operator tries to read the code C by the general reader which uses the visible light, the code C can be prevented from being decoded, thereby raising security of the code C.

In contrast, in the information code reader 40 according to the present invention, the illumination light of the second wavelength band (i.e., the infrared light) is emitted to the medium 10 for imaging. Thus, as shown in FIG. 17B and other figures, the inversion areas which are the light module areas can be inverted to a light color state, and in this lit state, the code C can be imaged. Accordingly, in the inversion areas and an area surrounding the inversion areas, the light module areas can be clearly differentiated from the dark module areas. The encoding means extracts the areas of the light and dark modules in the acquired image, and encodes the code C based on the extracted results. It is therefore possible to encode the information code reliably.

Furthermore, for example, as shown in FIG. 17A, in the normal state where the visible light is dominant, both of the light and dark modules which are present in, at least, part of the medium 10, i.e., the code C, is viewed as being dark. Such a partial region is set to be sufficiently wider so as to disenable the decoding using error correction patterns. Hence, if the code C is copied by copy machines or cameras which uses the reflection of the visible light, a copied image still includes the part appearing in a dark color. Wrongful leakage or unauthorized use of the data in the code C, which are due to copying, can be prevented reliably.

In addition, in the codes C shown in FIGS. 17A, 17B, only part of the light module areas is set to the inversion areas and the other light module areas are set to areas which are not the inversion areas and show the light reflection characteristics when being put under the emission of the light having the first wavelength band.

According to this configuration, in the normal environment where the visible light is dominant, the light modules in the foregoing other part are recognized as being light (bright) and the dark modules adjacent to such light modules are recognized as being dark. Hence, a user can view visually the other part and correctly understand the position of the code C on the medium 10. This fact is also helpful for the user in using the reader 40 according to the present embodiment. That is, it becomes easier for the user to pay attention to the position of the code C on the medium 10, so that the user can easily maintain a proper relationship between the medium 10 and the information code reader 40, leading to user's reliable and smooth reading actions. Furthermore, the forgoing other part can be visually observed. Hence, users can easily check blurs which might be caused in the dark modules in the other part of the code C, and fatted and/or unclean dark modules, disposing of unusable code mediums, avoiding troubles in the reading process.

In addition, the feature pattern areas FP1-FP3 are located at the three corners as described in the codes C shown in FIGS. 17A, 17B, in which the inversion areas are produced so as to positionally be away from the feature pattern areas FP1-FP3.

According to this configuration, in the normal use environment, the feature patterns in the code C can be visible by users, the users can quickly understand the presence of the medium 10 and the position thereof.

Further, in reading the code C using the information code reader 40, the normal reading method that do not require the illumination light having the second wavelength band can be adopted to detect the feature pattern areas FP1-FP3. Hence, once the feature pattern areas have been detected, the illumination light having the second wavelength band can be emitted at a proper timing thereafter. In decoding the data acquired under the light of the second wavelength band, information indicative of the feature pattern areas FP1-FP3, which has already been detected, can be utilized in a combined manner. In this case, the decoding process can be shortened, speeding up the entire reading process and reducing calculation loads in the decoding process.

In the codes C shown in FIGS. 17A, 17B the filled area F1 is overlapped with the square code C and extends slightly beyond mutually opposed two edges of the code. The filled area F1 consist of the invention areas and the dark modules.

In the normal environment where the visible light is dominant, the dark filled area can thus be viewed to continuously cover the code C between both mutually opposed edges. In consequence, the general reader acting on the visible light images the code as two portions divided by the dark filled area, making it difficult to decode the code. In particular, the filled areas passes through at least mutually opposed two edges, whereby the filled area can be mapped easily to be larger in size a minimum area that makes error correction effective. It is possible to securely avoid a situation where the foregoing general reader can decode the code.

In the present embodiment and modifications, the codes C shown in FIGS. 17A, 17B may also be a partially non-disclosed code. When such a configuration is desired, a cryptography key and a decipherment algorithm are implemented in the information code reader 40.

In this case, secrecy of the data recorded in an information code can be enhanced, in addition to a high security obtained by making the code decoding difficult by the foregoing general reader. Data leakage which is due to use of unauthorized information code readers can be avoided reliably, whereby security to the data of codes can be enhanced.

In the information code reader 40 according to the present embodiment and its modifications, there can be provided the recognition means that includes the detector 201 (such as a nearby sensor), like the second embodiment. The detector is used to decide the presence of a medium and the reading start timing. In addition, the illuminating means is able to emit, at least, the infrared light in response to recognizing the medium 10.

Hence, the infrared light can be emitted using, as a trigger, the recognition of the medium 10, avoiding the infrared light, i.e. the light of the second wavelength band, from being emitted uselessly, saving power. The infrared light is not emitted until the presence of the medium 10 on which the code C is formed is recognized. When being recognized, the reading process can be prepared before emitting the infrared light, making acquisition of an image of the code quicker, resulting in an quick and reliable reading process as a whole.

Other Modifications

The foregoing embodiments and modifications can be developed or modified into a variety of other modes, which are still within the scope of the present invention.

Regarding to a practical application, the foregoing embodiments and modifications are exemplified about the parking ticket. However, the example will now be limited to such a parking ticket. Other applications include mounting boards of various written certificates such as certificates of residence and certificates of a seal impression, coupon for goods, regional development tickets, admission tickets, railway tickets, and other various tickets, which require a high security capability.

Another modification relates to designing the background of the code. The background design is not limited to those explained in the foregoing embodiments and modifications. For example, FIGS. 15A and 15B show another modification of a medium, in which a designed area De showing a character "D" is provided. In the area of this designed area De, an information code C is locally mapped so as to be implemented therein. This information code C is formed in the same manner described in the first and second embodiments. The region occupied by the character "D" still includes a remaining region other than an area occupied by the information code C. The remaining region is formed as a background A2 which has the same light reflection features as those background A2 in the first and second embodiments.

In this case, when the visible light is emitted, the medium is imaged such that the information code C is optically embedded in the background A2, as shown in FIG. 15A. In contrast, under the infrared light, the light modules A4 of the information code C and the inversion area A2 are optically inverted so as to be clear, as illustrated in FIG. 15B. This makes it possible to the dark modules A3 of the code C can be distinguished from the other areas, and in this light-reflected state, the code C is imaged.

In this way, the background area can be designed into various modes, so that in the normal environment with no infrared light, the area in which the information code C is formed shows the same type of light refection characteristics as that of the designed area. As a result, the information code area can be visualized as part of the designed area without any distinction therebetween. Thus, in the normal use environment, it becomes difficult to find the position of an information code on the medium, enhancing security of the code. It is also not required to secure an area for an information code C differently from the designed area. It is easier to obtain a larger space for the designed area, so that the information code C hardly spoils the degree of freedom for designing the designed area.

In the foregoing embodiments and modifications, the light of the second wavelength band is light of wavelengths of 750 nm or more, which belong to the infrared light. Instead, such light may be ultraviolet light of wavelets of 380 nm or more. In such a modification, the inversion areas are produced as areas that invert the reflection characteristics of the ultraviolet light which is emitted to the code. For this configuration, for example, ink visible under the ultraviolet light can be used to make the inversion areas, in place of using the ink visible under the infrared light.

In the first and second embodiments, the medium has been described as shown in FIG. 2, where the dark background A2 is mapped on part of the medium of a light color (white or other similar colors). As a modification, the background shown in FIG. 2 can cover a one-sided all area of the medium. For example, as in FIG. 2, the dark background A2 can be arranged to extend on all the surface of the medium 10, which can provide a black card for instance. In this case, areas of information, B2-B7, may be light-color characters and/or figures. The area in which the information code C can be arranged can be made larger in size on one side of the medium 10, enabling the information code to be arranged more freely.

In this modification having the background fully extending on one side of the medium, the background can be formed as the non-inversion areas, not limited to the inversion areas. In such a case, an information code is produced as a light/dark inverted code. And the areas which should be formed as light modules are produced as the non-inversion areas, while the areas which should be formed as dark modules are produced as the inversion areas. Under the second illumination light, the areas assigned to the dark models (i.e., the inversion areas) appear as light-color areas in the light/dark inversion in the dark background fully extending on the one side of the medium. The areas assigned to the light modules appear as dark areas in the light/dark inversion, providing a reliable reading capability.

In the foregoing embodiments and modifications, instead of the partially non-disclosed code, the information code C may be other types of information codes, such as one-dimensional codes including bar codes, or two-dimensional codes including QR codes, data matrix codes and maxima codes.

The second information code Ca used in the first and second embodiments can be produced other types of codes, not limited to that shown in FIG. 9. For example, the second information code can be a one-dimensional bar code, another type of QR code different from that shown in FIG. 9. Of course, data matrix codes and maxima codes may be used as the second information code. In addition, the second information code Ca can be produced as a partially non-disclosed code, like the information code C shown in the first embodiment. In any modification listed here, the system configuration as well as control and reading methods descried in the second embodiment can be used.

Regarding the recognition of the medium described in the second embodiment, instead of using the detector 201 (refer to FIG. 14), an event can be used to detect the presence of the medium. Such an event shows that the medium 10 is likely to be imaged at a higher probability. For example, the parking management system 100 shown in FIG. 13 can be modified such that the detector 201 is changed to a vehicle detector, and the detector 201 detects a vehicle which comes in a predetermined detection (distance) range of the detector 201. When the detector 201 outputs a signal showing that a vehicle is present in its detection range, the illumination light of the second wavelength band (including the infrared light) is started to be emitted.

In the parking management system 100, it is assumed that the driver performs fee adjustment without getting off the car. Hence, a vehicle comes closer to the fee adjustment device 102, there is a higher possibility that a parking ticket, that is, a medium with the information code, comes in the predetermined imaging range of the device. Hence, in response to detection of an approaching vehicle, the illumination light, which is the infrared light for instance, can be emitted. This makes it possible to save power and prepare quickly for reading the ticket, thereby smoothing the processes for the fee adjustment. Incidentally, the preparation for the reading process may include not only the emission of the light of the second wavelength band but also drive process for other members in the fee adjustment device, such as drive of rollers to pull in the ticket from the insertion opening.

In addition, the detector 201 can be arranged as a human sensor which detects a human who is within a predetermined range from the sensor. In response to a signal from this sensor, the second illumination light can be radiated.

In the second embodiment, as shown in FIG. 14, the detector 210 is arranged within the reader 40, but this is just one example. It is not always necessary to dedicatedly arrange the sensor in the reader. The imaging section 42 can image the medium to recognize the presence of the medium 10. For example, the imaging section 42 is configured to pick up images at short intervals, and check to see if there are any changes in the picked-up images. Examples of such changes are listed as follows: changes in amounts of light received by all the pixels composing each of the respective images are over a preset value, or amounts of light received by part of the pixels composing each of the respective images. If there are such changes, it is recognized that the medium 10 exists in the insertion opening, which is followed by emitting the second illumination light including the infrared light.

In the embodiments and modifications, the first and second types of ink can be applied with the use of various known methods, such as printing methods of using an ink-jet printer or relief printing, or methods of using stamps or seals.

What is claimed is:

1. A system for reading an information code, comprising:
a reader; and
a medium on or in which an information code is formed, the information code having light modules and dark modules,
wherein the reader comprises:
illuminating means for emitting illumination light;
imaging means for imaging the medium to which the illumination light is emitted by the illuminating means; and
decoding means for extracting and decoding the information code from an image of the medium obtained by the imaging means,
wherein the medium has inversion areas and non-inversion areas, the inversion areas i) presenting reflection characteristics on one of a dark color and a light color when light of a first wavelength band including at least a visible light band is emitted to the medium and ii) presenting reflection characteristics on the other of the dark color and the light color when light of a second wavelength band different in wavelengths from the first wavelength band is emitted to the medium, the non-inversion areas iii) presenting the reflection characteristics on the one of the dark color and the light color when the light of the first wavelength band is emitted to the medium and iv) representing the reflection characteristics on the one of the dark color and the light color when the light of the second wavelength band is emitted to the medium, both the inversion areas and the dark modules presenting the same color when the light of the first wavelength band is emitted to the medium;
either the light modules or the dark modules of the code is arranged as one of the inversion areas and the non-inversion areas, and the other of the light modules and the dark modules of the code is arranged as the other of the inversion areas and the non-inversion areas;
the illuminating means includes a second illumination light emitting means emitting the illumination light of the second wavelength band toward the medium;
the imaging means is configured to image the medium in a state where the light of the second wavelength band is emitted to the medium; and
the decoding means is configured to detect, from the image, the inversion areas and the non-inversion areas differentiatedly so as to extract the areas of the light modules and the dark modules and to decode the information code based on extracted results.

2. The system according to claim 1, wherein
the illuminating means includes, in addition to the second illumination light emitting means, a first illumination light emitting means emitting the illumination light of the first wavelength band to the medium; and
the imaging means is configured to image the medium in a state where the light of the second wavelength band and the light of the first wavelength band are emitted to the medium.

3. The system according to claim 2, wherein each of the first and second illumination light emitting means has light sources, the light sources of the second illumination light emitting means being larger in number than the light sources of the first illumination light emitting means.

4. The system according to claim 2, wherein
the medium has a specific region formed with a combination of the inversion and non-inversion areas and a further region other than the specific region on the medium, the information code being mapped in the specific region and a second information code being mapped in the further region;
the second information code has light modules showing light reflection characteristics to the light of the first wavelength band and dark modules showing dark reflection characteristics to the light of the first wavelength band area;
the first and second illumination light emitting means are configured to emit the light of the first and second wavelength bands in parallel for, at least, a preset period of time;
the image means is configured to image the medium under parallel emission of the light of the first and second wavelength bands; and
the decoding means is configured to extract both the information code and the second information code for encoding thereof.

5. The system according to claim 4, wherein the information code and the second information code are printed by using the same type of ink.

6. The system according to claim 1, wherein
the inversion areas are formed to show the dark reflection characteristics to the light of the first wavelength band and the light reflection characteristics to the light of the second wavelength band;
the non-inversion areas are formed to show the dark reflection characteristics to the light of the first and second wavelength bands; and
the information code has the dark modules formed in the non-inversion areas and the light modules formed in the inversion areas.

7. The system according to claim 1, wherein the medium has a background area continuing to and surrounding an area with the information code formed thereon, the background area consisting of either the inversion areas or the non-inversion areas.

8. The system according to claim 6, wherein
the medium has a background area continuing to and surrounding an area with the information code formed thereon, the background area consisting of either the inversion areas or the non-inversion areas, and
the background area substantially occupies part of a surface of the medium and formed as the inversion area of a dark color, the part extending fully to cross the surface.

9. The system according to claim 6, wherein the background area is an area designed with at least one of characters, figures, symbols, markings, and a combination thereof.

10. The system according to claim 7, wherein
the medium is a sheet of thermal paper;
the information code is printed on the sheet of thermal paper by a thermal print method; and
the background area is printed using ink.

11. The system according to claim 1, wherein the medium has a first coloring medium showing the dark reflection characteristics to the emission of the light of the first wavelength band and the light reflection characteristics to the emission of the light of the second wavelength band and a second coloring medium showing the dark reflection characteristics to the emission of the light of the first and second wavelength bands,
wherein the dark modules are formed by the second coloring medium, and
all the areas of the dark modules formed by the second coloring medium are overlapped with part of an area formed by the first coloring medium.

12. The system according to claim 1, wherein the information code is a partially non-disclosed code which includes in part a non-disclosed region in which data encrypted based on a cryptography key are recorded.

13. A system for reading an information code, comprising:
a reader; and
a medium on or in which an information code is formed, the information code having light modules and dark modules,
wherein the reader comprises:
illuminating means for emitting illumination light;
imaging means for imaging the medium to which the illumination light is emitted by the illuminating means; and
decoding means for extracting and decoding the information code from an image of the medium obtained by the imaging means,
wherein the medium has inversion areas and non-inversion areas, the inversion areas i) showing dark reflection characteristics when light of a first wavelength band including at least a visible light band is emitted to the medium and ii) showing light reflection characteristics when light of a second wavelength band different in wavelengths from the first wavelength band is emitted to the medium, the non-inversion areas iii) showing the dark reflection characteristics when the light of the first wavelength band is emitted to the medium and iv) showing the dark reflection characteristics when the light of the second wavelength band is emitted to the medium, both the inversion areas and the dark modules presenting the same color when the light of the first wavelength band is emitted to the medium;
the areas of the light modules are produced as the inversion areas and the areas of the dark modules are produced as the non-inversion areas in at least part of an area in which the information code is formed on the medium, the information code being prevented from being encoded when the inversion areas are recognized as dark areas,
the illuminating means includes a second illumination light emitting means emitting the illumination light of the second wavelength band toward the medium;
the imaging means is configured to image the medium in a state where the light of the second wavelength band is emitted to the medium; and
the decoding means is configured to detect, from the image, the inversion areas and the non-inversion areas differentiatedly so as to extract the areas of the light modules and the dark modules and to decode the information code based on extracted results.

14. The system according to claim 13, wherein
the illuminating means includes, in addition to the second illumination light emitting means, a first illumination light emitting means emitting the illumination light of the first wavelength band to the medium; and
the imaging means is configured to image the medium in a state where the light of the second wavelength band and the light of the first wavelength band are emitted to the medium at the same time or at different times.

15. The system according to claim 13, wherein only areas of part of the light modules is produced as the inversion areas and areas of a remaining part of the light modules is not the inversion areas but is formed to show the light reflection characteristics under the emission of the light of the first wavelength band.

16. The system according to claim 15, wherein the information code has a feature pattern area having a preset shape and being located at a predetermined part of the medium, the inversion area being produced at locations other than the feature pattern area.

17. The system according to claim 15, wherein the information code has a feature pattern area having a preset shape and being located at a predetermined part of the medium, the inversion area being produced in the feature pattern area.

18. The system according to claim 13, wherein the information code is a partially non-disclosed code which includes in part a non-disclosed region in which data encrypted based on a cryptography key are recorded.

19. The system according to claim 13, wherein the reader comprises recognition means for recognizing a presence of the medium,
wherein the illuminating means is configured to emit, at least, the illumination light of the second wavelength band when the recognition means recognizes the presence of the medium.

20. A reader that reads an information code, comprising:
illuminating means for emitting illumination light to a medium on which an information code with light modules and dark modules are formed;
imaging means for imaging the medium to which the illumination light is emitted by the illuminating means; and
decoding means for extracting and decoding the information code from an image of the medium obtained by the imaging means,
wherein the medium has inversion areas and non-inversion areas, the inversion areas i) presenting reflection characteristics on one of a dark color and a light color when light of a first wavelength band including at least a visible light band is emitted to the medium and ii) presenting reflection characteristics on the other of the dark color and the light color when light of a second wavelength band different in wavelengths from the first wavelength band is emitted to the medium, the non-inversion areas iii) presenting the reflection characteristics on the one of the dark color and the light color when the light of the first wavelength band is emitted to the medium and iv) representing the reflection characteristics on the one of the dark color and the light color when the light of the second wavelength band is emitted to the medium, both the inversion areas and the dark modules presenting the same color when the light of the first wavelength band is emitted to the medium;
either the light modules or the dark modules of the code is arranged as one of the inversion areas and the non-inversion areas, and the other of the light modules and the dark modules of the code is arranged as the other of the inversion areas and the non-inversion areas;
the illuminating means includes a second illumination light emitting means emitting the illumination light of the second wavelength band toward the medium;
the imaging means is configured to image the medium in a state where the light of the second wavelength band is emitted to the medium; and the decoding means is configured to detect, from the image, the inversion areas and the non-inversion areas differentiatedly so as to extract the areas of the light modules and the dark modules and to decode the information code based on extracted results.

21. A reader that reads an information code, comprising:

illuminating means for emitting illumination light to a medium on which an information code with light modules and dark modules are formed;

imaging means for imaging the medium to which the illumination light is emitted by the illuminating means; and decoding means for extracting and decoding the information code from an image of the medium obtained by the imaging means, wherein the medium has inversion areas and non-inversion areas, the inversion areas i) showing dark reflection characteristics when light of a first wavelength band including at least a visible light band is emitted to the medium and ii) showing light reflection characteristics when light of a second wavelength band different in wavelengths from the first wavelength band is emitted to the medium, the non-inversion areas iii) showing the dark reflection characteristics when the light of the first wavelength band is emitted to the medium and iv) showing the dark reflection characteristics when the light of the second wavelength band is emitted to the medium, both the inversion areas and the dark modules presenting the same color when the light of the first wavelength band is emitted to the medium;

the areas of the light modules are produced as the inversion areas and the areas of the dark modules are produced as the non-inversion areas in at least part of an area in which the information code is formed on the medium, the information code being prevented from being encoded when the inversion areas are recognized as dark areas, the illuminating means includes a second illumination light emitting means emitting the illumination light of the second wavelength band toward the medium;

the imaging means is configured to image the medium in a state where the light of the second wavelength band is emitted to the medium; and the decoding means is configured to detect, from the image, the inversion areas and the non-inversion areas differentiatedly so as to extract the areas of the light modules and the dark modules and to decode the information code based on extracted results.

22. A medium on which an information code is formed, the information code having light modules and dark modules, wherein the information code has inversion areas and non-inversion areas, the inversion areas i) presenting reflection characteristics on one of a dark color and a light color when light of a first wavelength band including at least a visible light band is emitted to the medium and ii) presenting reflection characteristics on the other of the dark color and the light color when light of a second wavelength band different in wavelengths from the first wavelength band is emitted to the medium, the non-inversion areas iii) presenting the reflection characteristics on the one of the dark color and the light color when the light of the first wavelength band is emitted to the medium and iv) representing the reflection characteristics on the one of the dark color and the light color when the light of the second wavelength band is emitted to the medium, both the inversion areas and the dark modules presenting the same color when the light of the first wavelength band is emitted to the medium; and either one of the light modules and the dark modules of the code are produced as one of the inversion areas and the non-inversion areas, and the other modules of the light modules and the dark modules of the code are produced as the other of the inversion areas and the non-inversion areas.

23. The system according to claim 2, wherein the inversion areas are formed to show the dark reflection characteristics to the light of the first wavelength band and the light reflection characteristics to the light of the second wavelength band;

the non-inversion areas are formed to show the dark reflection characteristics to the light of the first and second wavelength bands; and the information code has the dark modules formed in the non-inversion areas and the light modules formed in the inversion areas.

24. The system according to claim 3, wherein the inversion areas are formed to show the dark reflection characteristics to the light of the first wavelength band and the light reflection characteristics to the light of the second wavelength band;

the non-inversion areas are formed to show the dark reflection characteristics to the light of the first and second wavelength bands; and the information code has the dark modules formed in the non-inversion areas and the light modules formed in the inversion areas.

25. The system according to claim 15, wherein the information code is a partially non-disclosed code which includes in part a non-disclosed region in which data encrypted based on a cryptography key are recorded.

26. The system according to claim 15, wherein the reader comprises recognition means for recognizing a presence of the medium, wherein the illuminating means is configured to emit, at least, the illumination light of the second wavelength band when the recognition means recognizes the presence of the medium.

27. The reader according to claim 20, wherein the inversion areas are formed to show the dark reflection characteristics to the light of the first wavelength band and the light reflection characteristics to the light of the second wavelength band;

the non-inversion areas are formed to show the dark reflection characteristics to the light of the first and second wavelength bands; and the information code has the dark modules formed in the non-inversion areas and the light modules formed in the inversion areas.

28. The reader according to claim 27, wherein the medium has a background area continuing to and surrounding an area with the information code formed thereon, the background area consisting of either the inversion areas or the non-inversion areas, and the background area substantially occupies part of a surface of the medium and formed as the inversion area of a dark color, the part extending fully to cross the surface.

29. The reader according to claim 27, wherein the background area is an area designed with at least one of characters, figures, symbols, markings, and a combination thereof.

30. The system according to claim 1, wherein the dark modules are arranged as the non-inversion areas and present the reflection characteristics on the dark color when the light of the first wavelength band is emitted to the medium, and the inversion areas presenting the dark color when the light of the first wavelength band is emitted to the medium.

31. The system according to claim 13, wherein the dark modules are arranged as the non-inversion areas and present the reflection characteristics on the dark color when the light of the first wavelength band is emitted to the medium, and the inversion areas presenting the dark color when the light of the first wavelength band is emitted to the medium.

32. The reader according to claim 20, wherein the dark modules are arranged as the non-inversion areas and present the reflection characteristics on the dark color when the light of the first wavelength band is emitted to the medium, and the inversion areas presenting the dark color when the light of the first wavelength band is emitted to the medium.

33. The reader according to claim 21, wherein the dark modules are arranged as the non-inversion areas and present the reflection characteristics on the dark color when the light of the first wavelength band is emitted to the medium, and the inversion areas presenting the dark color when the light of the first wavelength band is emitted to the medium.

* * * * *